(12) United States Patent
Kihara et al.

(10) Patent No.: US 10,860,048 B2
(45) Date of Patent: Dec. 8, 2020

(54) PEDAL DEVICE

(71) Applicant: DENSO CORPORATION, Kariya (JP)

(72) Inventors: Noriyasu Kihara, Kariya (JP);
Haruhiko Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/265,124

(22) Filed: Feb. 1, 2019

(65) Prior Publication Data

US 2019/0163226 A1 May 30, 2019

Related U.S. Application Data

(63) Continuation of application No. PCT/JP2017/033808, filed on Sep. 20, 2017.

(30) Foreign Application Priority Data

Sep. 28, 2016 (JP) .................... 2016-189182

(51) Int. Cl.

| | | |
|---|---|---|
| *G05G 1/30* | (2008.04) | |
| *G01L 1/16* | (2006.01) | |
| *G01L 5/22* | (2006.01) | |
| *B60K 26/02* | (2006.01) | |
| *G05G 1/38* | (2008.04) | |
| *F02D 11/10* | (2006.01) | |

(Continued)

(52) U.S. Cl.
CPC ............ *G05G 1/38* (2013.01); *B60K 26/02* (2013.01); *F02D 11/106* (2013.01); *G01L 1/16* (2013.01); *G01L 1/2287* (2013.01); *G01L 5/225* (2013.01); *G05G 1/42* (2013.01)

(58) Field of Classification Search
CPC .. G05G 1/38; G05G 1/42; G05G 1/44; G05G 1/445; B60K 26/02; F02D 11/02; F02D 11/106; G01L 1/16; G01L 1/2287; G01L 5/225

See application file for complete search history.

(56) References Cited

U.S. PATENT DOCUMENTS

| | | | | |
|---|---|---|---|---|
| 5,563,355 A | * | 10/1996 | Pluta .................. | B60T 7/042 |
| | | | | 303/188 |
| 2004/0040408 A1 | * | 3/2004 | Shaw .................. | G05G 1/36 |
| | | | | 74/560 |

(Continued)

FOREIGN PATENT DOCUMENTS

| | | | | |
|---|---|---|---|---|
| DE | 102010028618 A1 | * | 11/2011 | ............ G05G 1/38 |
| JP | 61-171837 | | 8/1986 | |

(Continued)

OTHER PUBLICATIONS

Machine translation of DE 102010028618 A1 obtained on Jan. 8, 2020.*

(Continued)

*Primary Examiner* — Adam D Rogers
(74) *Attorney, Agent, or Firm* — Nixon & Vanderhye P.C.

(57) ABSTRACT

The pedal device includes a pedal portion which the operator depresses, a pedal effort detecting portion being configured to detect the magnitude of the pedal effort in the depression direction when the operator depresses the pedal portion and being configured to output a signal corresponding to the magnitude of the pedal effort to the outside.

19 Claims, 17 Drawing Sheets

(51) Int. Cl.
*G05G 1/42* (2008.04)
*G01L 1/22* (2006.01)

(56) References Cited

U.S. PATENT DOCUMENTS

| | | | | |
|---|---|---|---|---|
| 2007/0296268 | A1* | 12/2007 | Shaw | B60T 7/042 |
| | | | | 303/20 |
| 2015/0206675 | A1* | 7/2015 | Modi | G06F 3/02 |
| | | | | 307/119 |
| 2019/0220052 | A1* | 7/2019 | Kihara | B60K 26/02 |

FOREIGN PATENT DOCUMENTS

| | | |
|---|---|---|
| JP | 62-50632 | 3/1987 |
| JP | 2000-238624 | 9/2000 |
| JP | 2011170457 A * | 9/2011 |
| JP | 2012-183967 | 9/2012 |
| JP | 2012-193548 | 10/2012 |
| JP | 2015-625 | 1/2015 |
| JP | 2015-60454 | 3/2015 |
| WO | WO-2014033828 A1 * 3/2014 | ............... G05G 1/38 |

OTHER PUBLICATIONS

Machine translation of WO 2014033828 A1 obtained on Jan. 8, 2020.*

* cited by examiner

PEDAL DEVICE

CROSS REFERENCE TO RELATED APPLICATIONS

This application is a continuation application of International Patent Application No. PCT/JP2017/033808 filed on Sep. 20, 2017, which designated the U.S. and based on and claims the benefits of priority of Japanese Patent Application No. 2016-189182 filed on Sep. 28, 2016. The entire disclosure of all of the above applications is incorporated herein by reference.

TECHNICAL FIELD

The present disclosure relates to a pedal device.

BACKGROUND

Conventionally, a pedal device is mounted on a vehicle and controls a driving state of the vehicle in accordance with the force (hereinafter referred to as "pedal effort") that the driver depresses the pedal.

SUMMARY

An object of the present disclosure is to provide a pedal device capable of reliably detecting an operation amount of a pedal portion by an operator.

The pedal device according to a first embodiment of the present disclosure includes a pedal portion that an operator can depress, and a pedal effort detecting portion that is capable of detecting a magnitude of the pedal effort in a depression direction when an operator depresses the pedal portion, and outputs a signal corresponding to the magnitude of the pedal effort.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, various embodiments of the present disclosure will be described with reference to the drawings. In the following embodiments, substantially identical portions will be indicated by the same reference signs and will not be described redundantly.

First Embodiment

Figure 1:
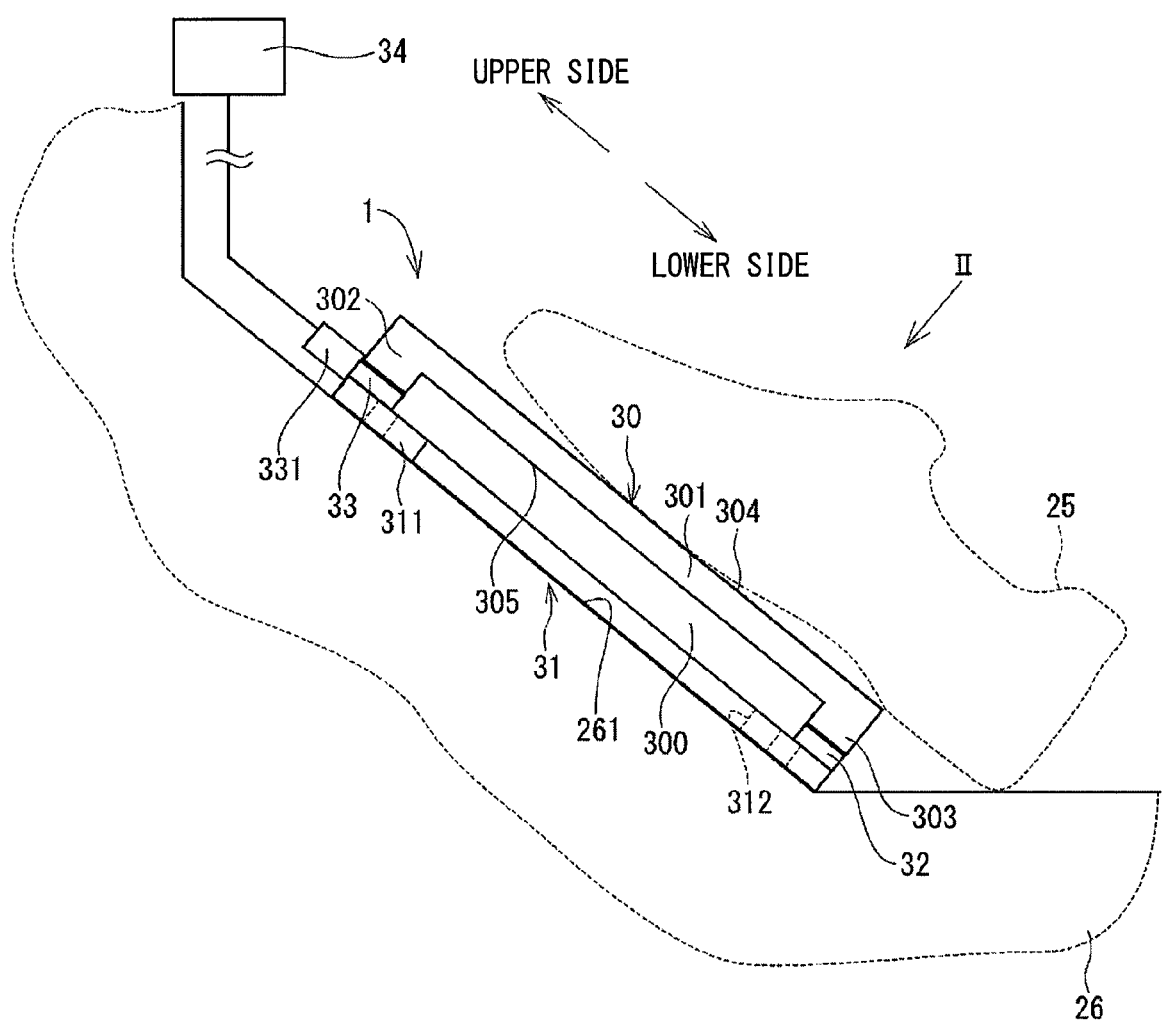
FIG. 1 is a schematic view of an accelerator device according to a first embodiment of a present disclosure.
Figure 2:
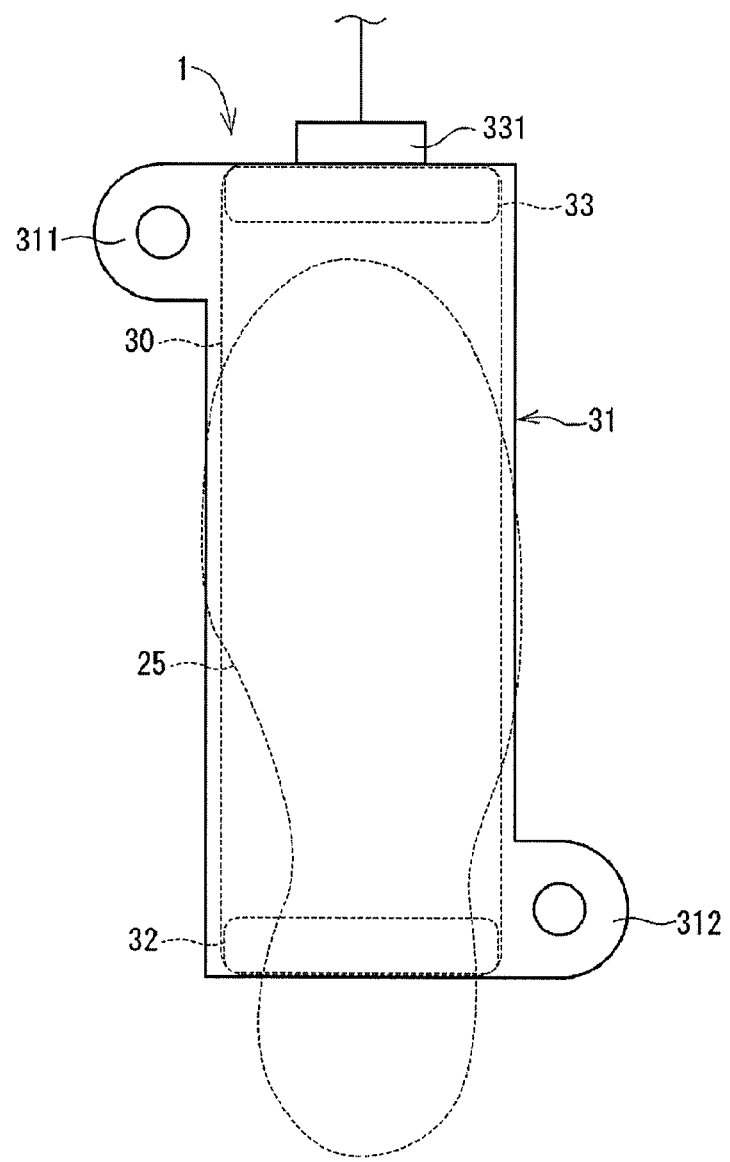
FIG. 2 is a front view seen from the direction II in FIG. 1.
Figure 3:
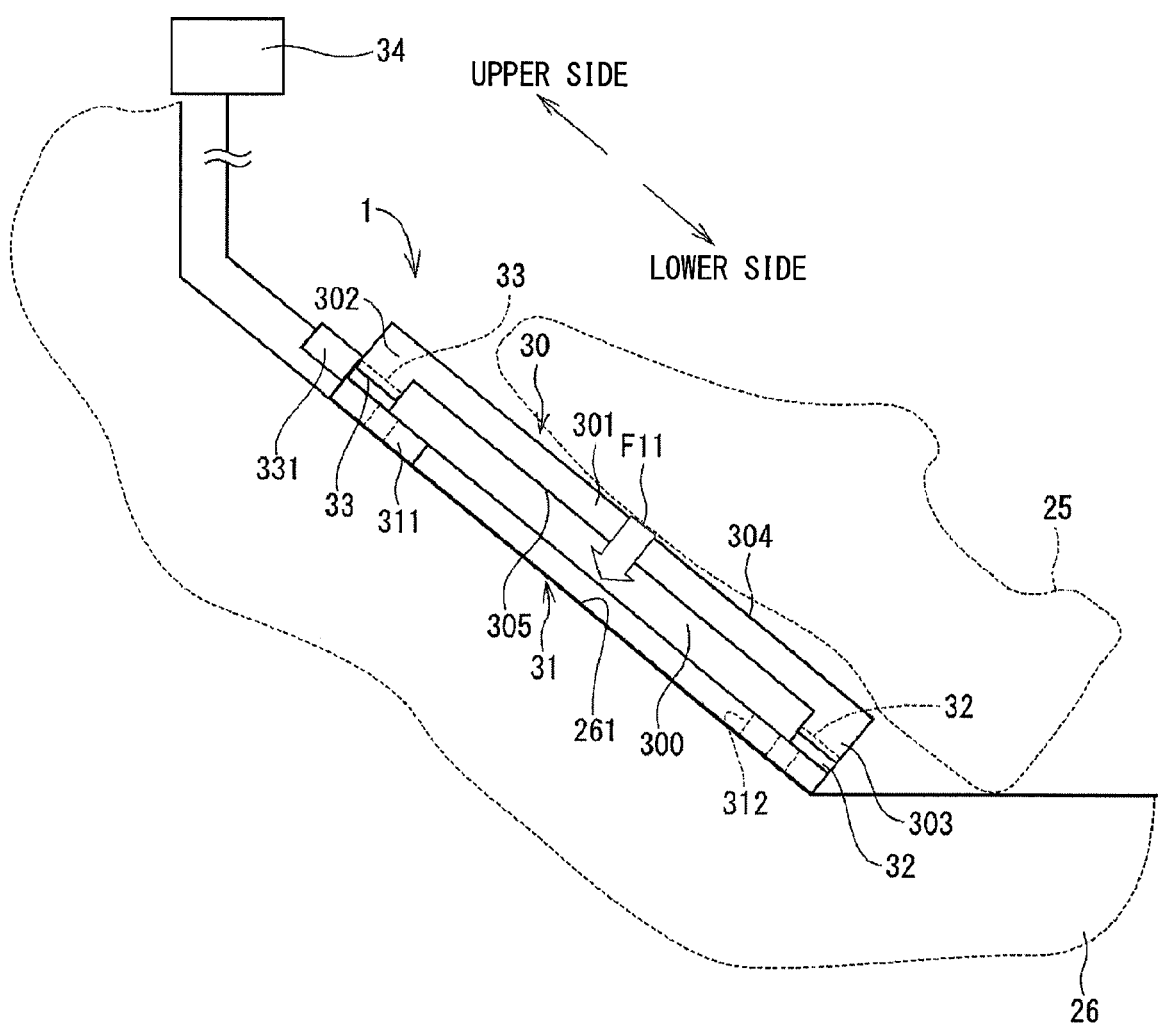
FIG. 3 is a schematic view showing a state when the accelerator device is depressed from the state of FIG. 1.

A pedal device according to a first embodiment of the present disclosure is shown in FIGS. 1 to 3. An accelerator device 1 as the "pedal device" is an input device operated by a driver as an "operator" of a vehicle in order to determine a valve opening degree of a throttle valve of a vehicle engine (not shown). The accelerator device 1 is of an electronic type, and when the driver depresses a pedal pad 30 as a "pedal portion", an electric signal representing a pedal effort as an "operation amount" is transmitted to an electronic control device (not shown). The electronic control device drives a throttle valve by a throttle actuator (not shown) on the basis of the depression amount and other information.

The accelerator device 1 includes a pedal pad 30, a base 31, an elastic support portion 32, a displacement amount sensor 33 as a "pedal effort detecting portion", and a calculating unit 34 as a "pedal effort detecting portion". The accelerator device 1 is mounted in a vehicle compartment (not shown) of the vehicle, and is supported to a vehicle body 26 at a place where the driver can depress with a foot 25. Hereinafter, in FIGS. 1 and 3, a toe side of the driver's foot 25 along an inner wall surface 261 of the vehicle body 26 is referred to as "upper side", and a heel side of the driver's foot 25 is referred to as "lower side".

The pedal pad 30 is a member formed in a substantially flat plate shape. The pedal pad 30 is supported to the base 31 via the elastic support portion 32 and the displacement amount sensor 33 so the driver can depress the pedal pad 30. The pedal pad 30 has a depression portion 301 and leg portions 302, 303.

The depression portion 301 is formed in a flat plate shape. The driver's foot 25 can be placed on a surface 304 of the depression portion 301 opposite to the vehicle body 26. Leg portions 302 and 303 are provided on a back surface 305 on the opposite side of the vehicle body 26, that is, the side on which the driver's foot on the depression portion 301 is placed is the back surface 305 on the opposite side of the vehicle body 26.

The leg portion 302 is provided on the upper side of the depression portion 301. The leg portion 303 is provided on the lower side of the depression portion 301. As a result, a clearance 300 is formed on the side of the vehicle body 26 with respect to the depression portion 301.

The base 31 is a substantially flat plate-like member fixed to an inner wall surface 261 of the vehicle body 26. As shown in FIG. 2, the base 31 has a fixing portion 311 on the upper left side of the accelerator device 1 as viewed from the direction the driver depresses. In addition, the base 31 has a fixing portion 312 on the lower right side of the accelerator device 1 as viewed from the direction the driver depresses. The fixing portions 311 and 312 have screw holes for fixing the base 31 to the vehicle body 26.

The elastic support portion 32 is provided between the leg portion 303 of the pedal pad 30 and the base 31. The elastic support portion 32 is formed of an elastic material and is deformed together with a displacement amount sensor 33 described later when the driver depresses the pedal pad 30. As a result, the pedal pad 30 can move substantially in parallel with the depression direction of the driver.

The displacement amount sensor 33 is provided between the leg portion 302 of the pedal pad 30 and the base 31. The displacement amount sensor 33 is, for example, a conductive member having elasticity, and is formed so as to be deformable when the driver depresses the pedal pad 30. The displacement amount sensor 33 is capable of outputting an electric signal corresponding to its own electric resistance via a connector 331 when the driver depresses the pedal pad 30.

The calculating unit 34 is electrically connected to the displacement amount sensor 33 via the connector 331. The calculating unit 34 calculates the change amount of the electric resistance of the displacement amount sensor 33 itself output from the displacement amount sensor 33 as the pedal effort in the driver's depression direction.

Next, the operation of the accelerator device 1 will be described with reference to FIGS. 1 and 3. In FIG. 3, the elastic support portion 32 and the displacement amount sensor 33 in a state where the driver does not depress the pedal pad 30 are indicated by dotted lines.

When the driver depresses the pedal pad 30, the pedal effort in the direction the driver depresses (the direction indicated by the outlined arrow F11 in FIG. 3) acts on the elastic support portion 32 and the displacement amount sensor 33, and the displacement amount sensor 33 is compressed and deformed. The displacement amount sensor 33 outputs an electric signal corresponding to its own electric resistance changed by compression to an calculating unit 34. The calculating unit 34 calculates the pedal effort in the depression direction of the driver based on the electric signal outputted by the displacement amount sensor 33 and outputs the electric signal corresponding to the pedal effort to the electronic control device. The electronic control unit controls driving of the throttle valve based on the electric signal outputted by the calculating unit 34.

(A) In the case of the accelerator device equipped with the pedal pad provided on a rotatable shaft, the pedal pad rotates about the rotational axis of the shaft by stepping on the pedal pad by the driver. That is, the operation amount of the pedal pad by the driver appears as the rotation angle with respect to the shaft. However, for example, if the operation of the pedal pad by the driver is different between a normal situation when the driver depresses the pedal pad while the heel being attached to the vehicle body and an emergency situation when the driver steps on the pedal pad without attaching the heel to the vehicle body, the operation amount of the pedal pad intended by the driver may not be reliably detected.

In the accelerator device 1 according to the first embodiment, when the driver depresses the pedal pad 30, the displacement amount sensor 33 deforms in the direction in which the driver depresses. That is, the magnitude of the pedal effort in the direction the driver depresses the pedal pad 30 appears as the displacement amount of the displacement amount sensor 33. The displacement amount of the displacement amount sensor 33 is calculated by the calculating unit 34 as the pedal effort in the depressing direction of the driver. As a result, in the accelerator device 1, it is possible to reliably detect the pedal effort in the direction in which the driver depresses in both the normal situation and the emergency situation. Therefore, the accelerator device 1 can reliably detect the operation amount of the pedal pad 30 by the driver.

(B) In addition, in the accelerator device 1 according to the first embodiment, the magnitude of the pedal effort in the direction in which the driver depresses the pedal pad 30 appears as the displacement amount of the displacement amount sensor 33, so that in either the normal situation or the emergency situation, and it is possible to perform the operation intended by the driver with a relatively small stroke. Therefore, in the accelerator device 1, it is possible to quickly operate the pedal pad 30 in case of emergency.

Second Embodiment

Figure 4:
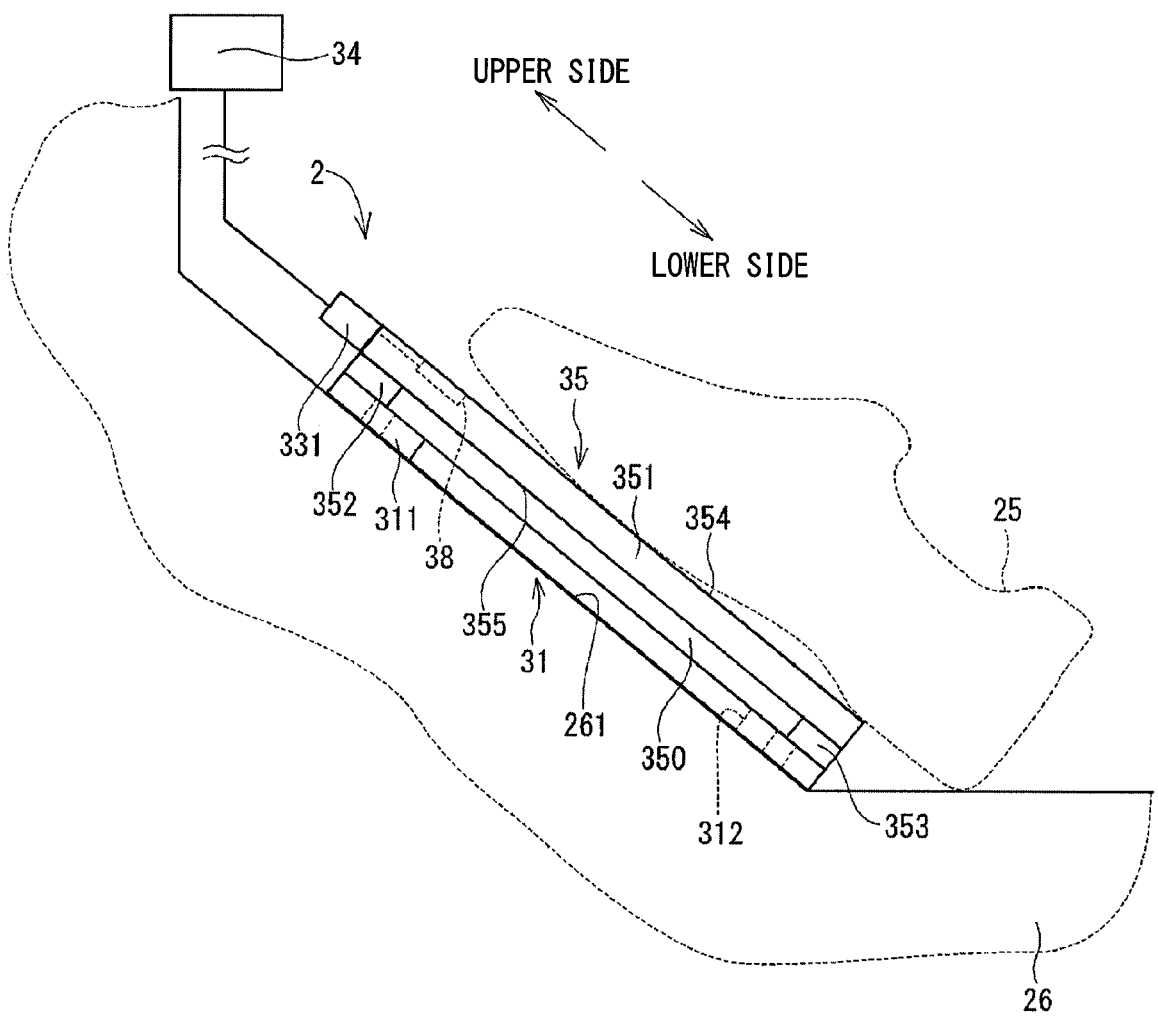
FIG. 4 is a schematic diagram of an accelerator device according to a second embodiment of the present disclosure.
Figure 5:
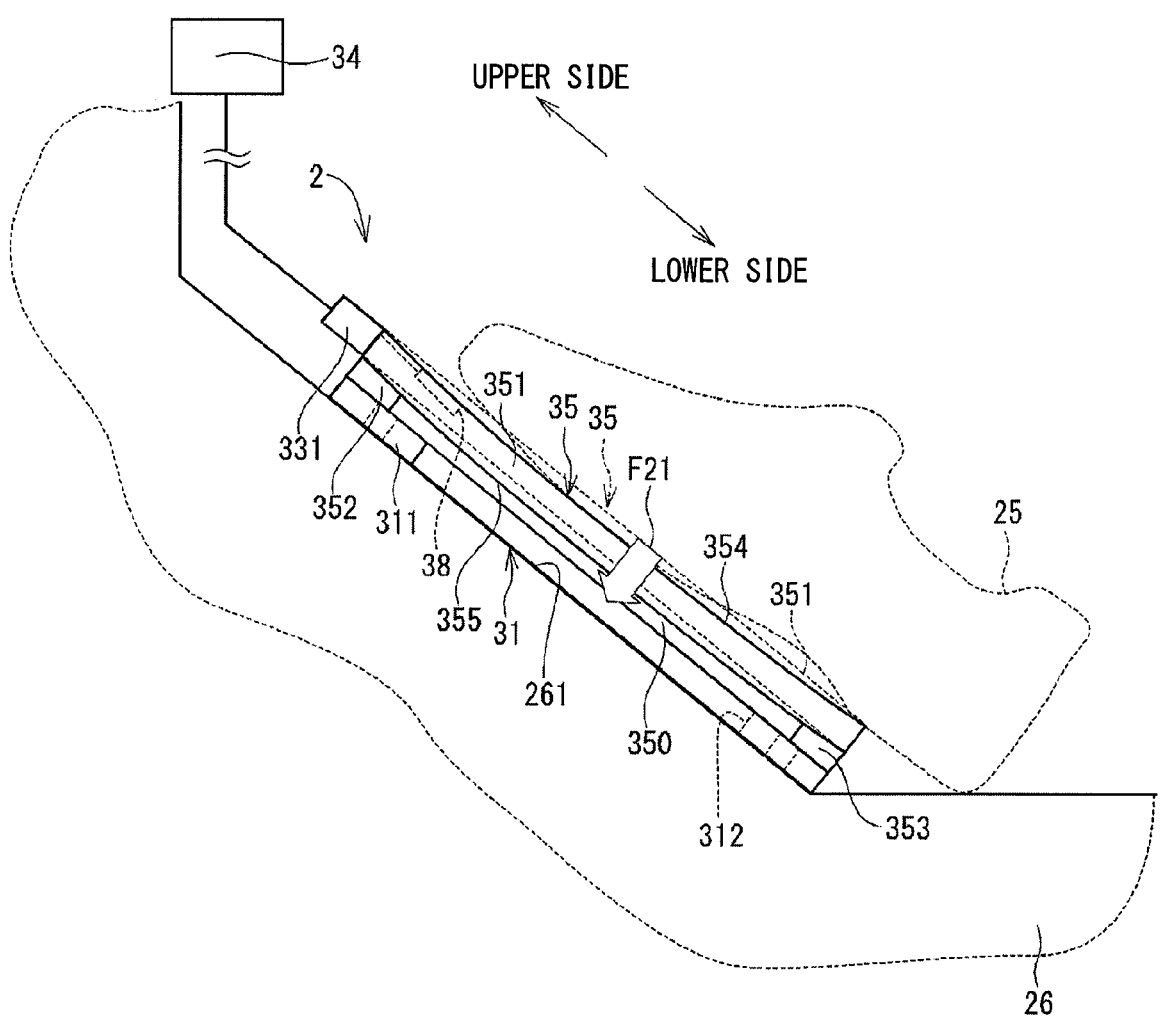
FIG. 5 is a schematic diagram showing a state when the accelerator device according to the second embodiment of the present disclosure is depressed.

Next, a pedal device according to a second embodiment of the present disclosure will be described with reference to FIGS. 4 and 5. The second embodiment is different from the first embodiment regarding the target of detecting the displacement amount.

The accelerator device 2 as the "pedal device" according to the second embodiment has the pedal pad 35 as a "pedal portion", the base 31, a strain gauge 38 as a "pedal effort detecting portion", and the calculating unit 34. Hereinafter, in FIGS. 4 and 5, a toe side of the driver's foot 25 along an inner wall surface 261 of the vehicle body 26 is referred to as "upper side", and a heel side of the driver's foot 25 is referred to as "lower side".

The pedal pad 35 is a substantially flat plate-like member provided so that a driver can depress the pedal pad 35. The pedal pad 35 has a depression portion 351 and leg portions 352, 353.

The depression portion 351 is formed in a flat plate shape. The depression portion 351 is formed of a deformable flexible material. The driver's foot 25 can be placed on a surface 354 of the depression portion 351 opposite to the vehicle body 26.

The leg portions 352 and 353 are provided on the side opposite to the side on which the foot of the driver of the depression portion 351 is placed, that is, on a rear surface 355 of the depression portion 351 on the side of the vehicle body 26. The leg portion 352 is provided on an upper side of the depression portion 351 and fixed to the base 31. The leg portion 353 is provided on a lower side of the depression portion 351 and fixed to the base 31. As a result, a clearance 350 is formed on the side of the vehicle body 26 with respect to the depression portion 351.

The strain gauge 38 is provided on the surface 354 of the depression portion 351. The strain gauge 38 is capable of detecting the amount of displacement of the depression portion 351. The strain gauge 38 is capable of outputting an electric signal corresponding to the amount of displacement of the depression portion 351 via the connector 331.

The calculating unit 34 is electrically connected to the strain gauge 38 via the connector 331.

Next, the operation of the accelerator device 2 will be described with reference to FIG. 5. In FIG. 5, the pedal pad 35 in a state where the driver does not depress the pedal pad 35 is indicated by a dotted line.

When the driver depresses the pedal pad 35, the depression portion 351 is deformed by using the clearance 350 by the pedal effort (the direction indicated by the outlined arrow F21 in FIG. 5) in the direction the driver depressed. The strain gauge 38 detects the amount of displacement of the depression portion 351 and outputs an electrical signal corresponding to the amount of displacement to the calculating unit 34 via the connector 331. The calculating unit 34 calculates the pedal effort by the driver based on the electric signal outputted by the strain gauge 38 and outputs the electric signal corresponding to the pedal effort to the electronic control device.

In the accelerator device 2 according to the second embodiment, when the driver depresses the pedal pad 35, the depression portion 351 deforms in the direction the driver depresses. That is, the magnitude of the pedal effort in the direction in which the driver depresses the pedal pad 35 appears as the displacement amount of the depression portion 351. The amount of displacement of the depression portion 351 detected by the strain gauge 38 is calculated as the pedal effort of the driver by the calculating unit 34. As a result, the accelerator device 2 exhibits the effects (A) and (B) of the first embodiment.

Third Embodiment

Figure 6:
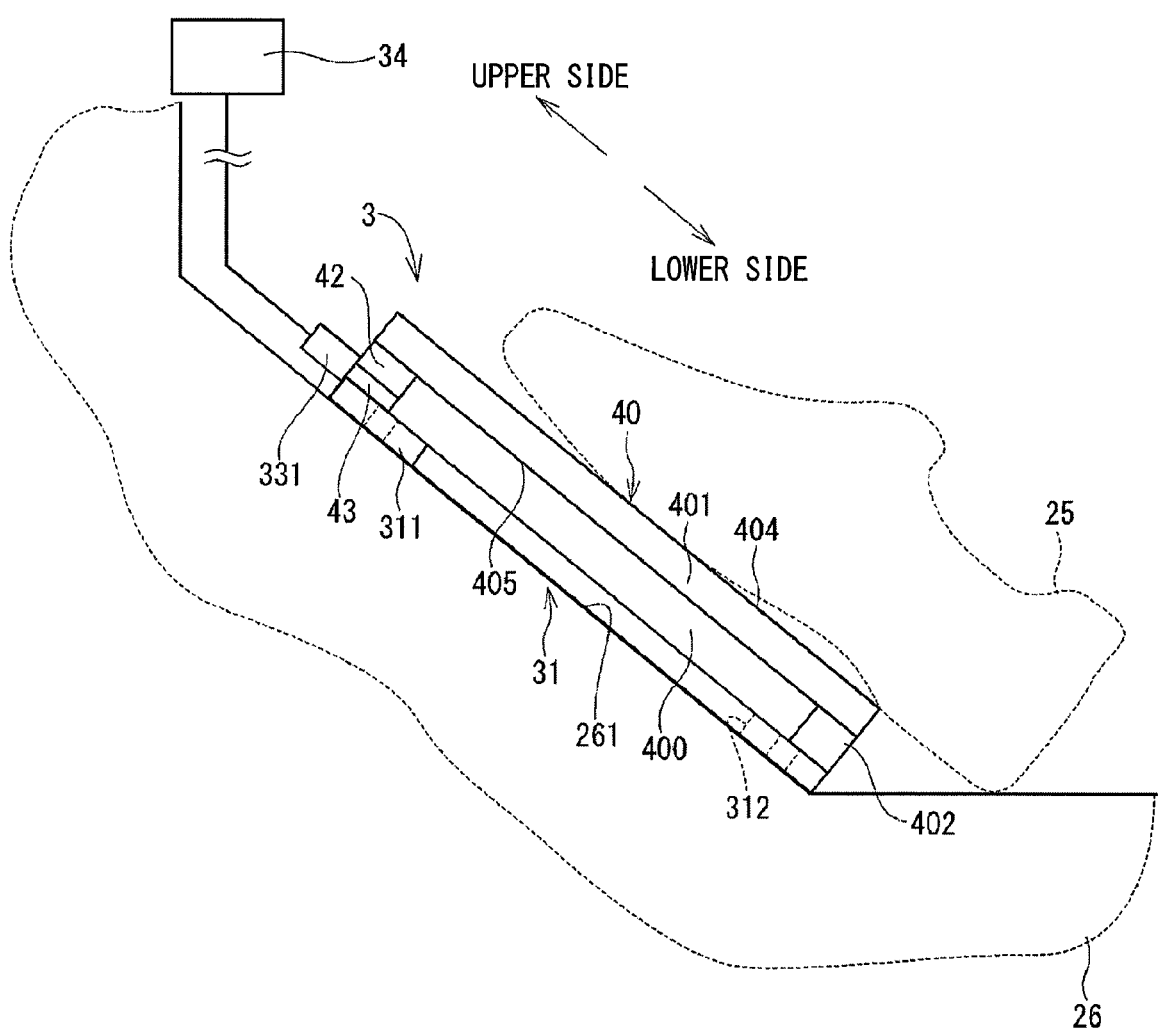
FIG. 6 is a schematic diagram of an accelerator device according to a third embodiment of the present disclosure.

Next, a pedal device according to the third embodiment of the present disclosure will be described with reference to FIG. 6. The third embodiment is different from the first embodiment in that the displacement amount sensor is provided with a deformable portion in which the displacement amount is detected as the displacement amount of the pedal pad.

The accelerator device 3 as a "pedal device" according to the third embodiment includes a pedal pad 40 as a "pedal portion", the base 31, a deformable portion 42 as a "pedal effort detecting portion", the displacement amount sensor 33, and the calculating unit 34. Hereinafter, in FIG. 6, a toe side of the driver's foot 25 along an inner wall surface 261 of the vehicle body 26 is referred to as "upper side", and a heel side of the driver's foot 25 is referred to as "lower side".

The pedal pad 40 is a substantially flat plate-like member provided so that a driver can depress the pedal pad 35. The pedal pad 40 has a depression portion 401 and leg portion 402.

The depression portion 401 is formed in a flat plate shape. The driver's foot 25 can be placed on a surface 404 of the depression portion 401 opposite to the vehicle body 26.

The leg portion 402 is provided on a lower side of the depression portion 401 and on the side of the vehicle body 26 with respect to the depression portion 401, that is, it is provided on a back surface 405 opposite to the side on which the foot of the driver is placed with respect to the depression portion 401. The leg portion 402 is formed of a rigid body and fixed to the base 31.

The deformable portion 42 is provided between the depression portion 401 of the pedal pad 40 and the displacement amount sensor 43 on the upper side of the pedal pad 40. The deformable portion 42 is formed of a deformable material.

The displacement amount sensor 43 is connected to the deformable portion 42 and can detect the displacement amount of the deformable portion 42. The displacement amount sensor 43 can output an electric signal corresponding to the displacement amount of the deformable portion 42 via the connector 331.

In the accelerator device 3, a gap 400 is formed between the depression portion 401 and the vehicle body 26. The depression portion 401 is supported by the deformable portion 42 and the displacement amount sensor 43 on the upper side and is supported by the leg portion 402 on the lower side. When the driver depresses the pedal pad 40, the deformable portion 42 is compressed and deformed in the direction the driver depresses. The displacement amount sensor 43 detects the displacement amount of the deformable portion 42, and outputs an electric signal corresponding to the displacement amount to the calculating unit 34. The calculating unit 34 calculates the pedal effort in the depression direction of the driver based on the electric signal outputted by the displacement amount sensor 43 and outputs the electric signal corresponding to the pedal effort to the electronic control device.

In the accelerator device 3 according to the third embodiment, when the driver depresses the pedal pad 40, the deformable portion deforms in the direction the driver depresses. That is, the magnitude of the pedal effort in the direction in which the driver depresses the pedal pad 40 appears as the displacement amount of the deformable portion 42. The amount of displacement of the deformable portion 42 detected by the displacement amount sensor 43 is calculated by the calculating unit 34 as a pedal effort of the driver. As a result, the accelerator device 3 exhibits the effects (A) and (B) of the first embodiment.

Fourth Embodiment

Figure 7:
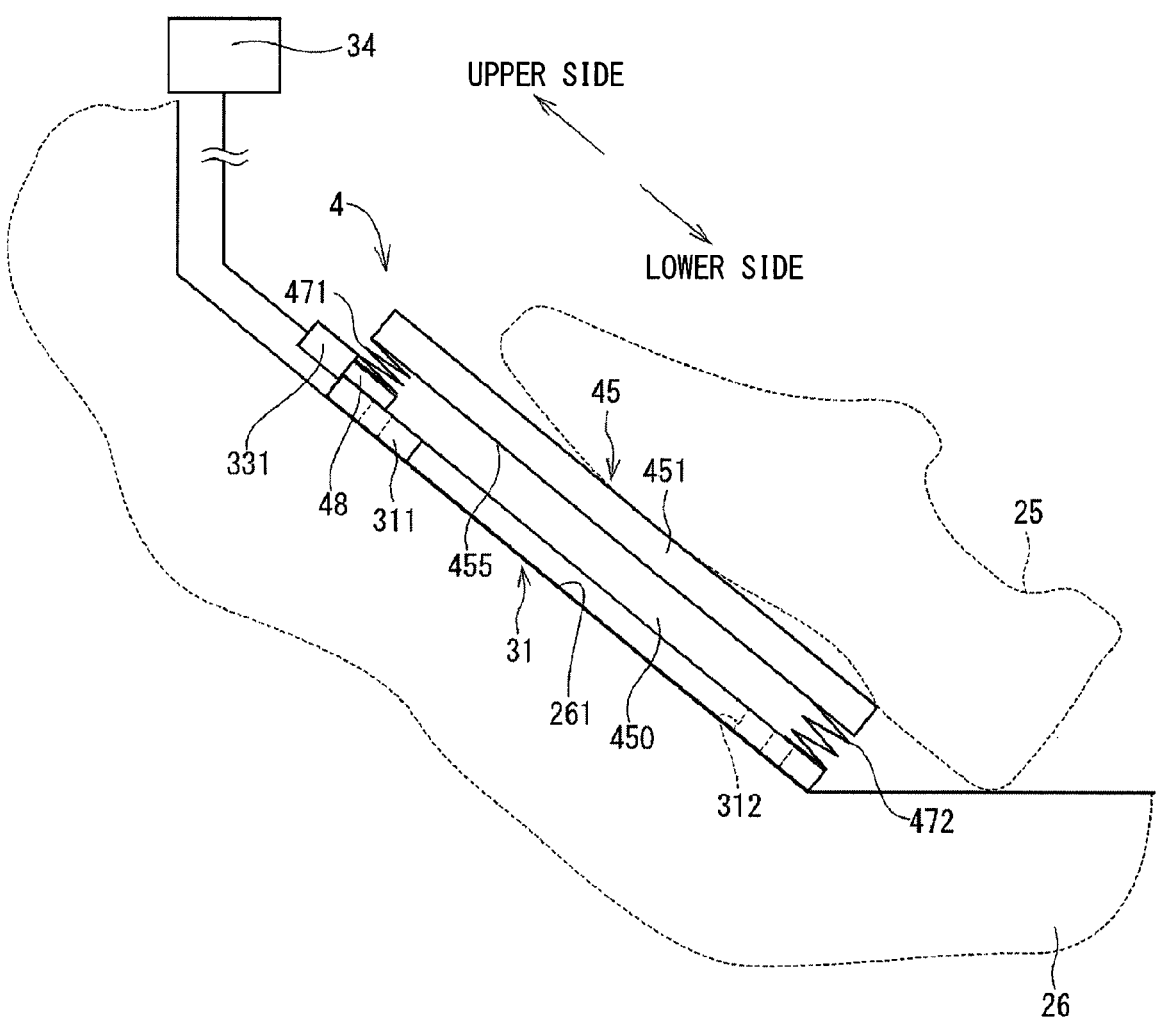
FIG. 7 is a schematic diagram of an accelerator device according to a fourth embodiment of the present disclosure.

Next, a pedal device according to the fourth embodiment of the present disclosure will be described with reference to FIG. 7. The fourth embodiment is different from the third embodiment in that the deformable portion is a spring.

The accelerator device 4 as a "pedal device" according to the fourth embodiment includes a pedal pad 45 as a "pedal portion", the base 31, a spring 471 and a spring 472 as a "pedal effort detecting portion" and a "deformable portion", a displacement amount sensor 48 as a "pedal effort detecting portion", and the calculating unit 34. Hereinafter, in FIG. 7, a toe side of the driver's foot 25 along an inner wall surface 261 of the vehicle body 26 is referred to as "upper side", and a heel side of the driver's foot 25 is referred to as "lower side".

The pedal pad 45 has a depression portion 451 that the driver can depress.

The depression portion 451 is formed in a flat plate shape. The depression portion 451 is supported by two springs 471, 472 so that a gap 450 can be formed between the depression portion 451 and the base 31. These springs 471, 472 are provided on the rear surface 455 of the depression portion 451, that is, on the side opposite to the side on which the foot 25 of the driver is placed with respect to the depression portion 451.

The spring 471 is provided between the depression portion 451 and the displacement amount sensor 48 on the upper side of the depression portion 451. The spring 471 can extend and retract in a direction in which the driver depresses the depression portion 451.

The spring 472 is provided between the depression portion 451 and the base 31 on the lower side of the depression portion 451. The spring 472 can extend and retract in a direction in which the driver depresses the depression portion 451.

The displacement amount sensor 48 is provided between the spring 471 and the base 31. The displacement amount sensor 48 is capable of detecting the displacement amount of the spring 471. The displacement amount sensor 48 is capable of outputting an electric signal corresponding to the displacement amount of the spring 471 via the connector 331.

The calculating unit 34 is electrically connected to the displacement amount sensor 48 via the connector 331.

In the accelerator device 4 according to the fourth embodiment, when the driver depresses the pedal pad 45, the springs 471 and 472 are compressed and deformed in the direction the driver depresses. The displacement amount sensor 48 detects the displacement amount of the spring 471, and outputs an electric signal corresponding to the displacement amount to the calculating unit 34. The calculating unit 34 calculates the pedal effort in the depression direction of the driver based on the electric signal outputted by the displacement amount sensor 48 and outputs the electric signal corresponding to the pedal effort to the electronic control device.

Further, in the accelerator device 4 according to the fourth embodiment, the magnitude of the pedal effort in the direction in which the driver depresses the pedal pad 45 appears as the displacement amount of the spring 471. The amount of displacement of the spring 471 detected by the displacement amount sensor 48 is calculated by the calculating unit 34 as a pedal effort of the driver. As a result, the accelerator device 4 exhibits the effects (A) and (B) of the first embodiment.

Fifth Embodiment

Figure 8:
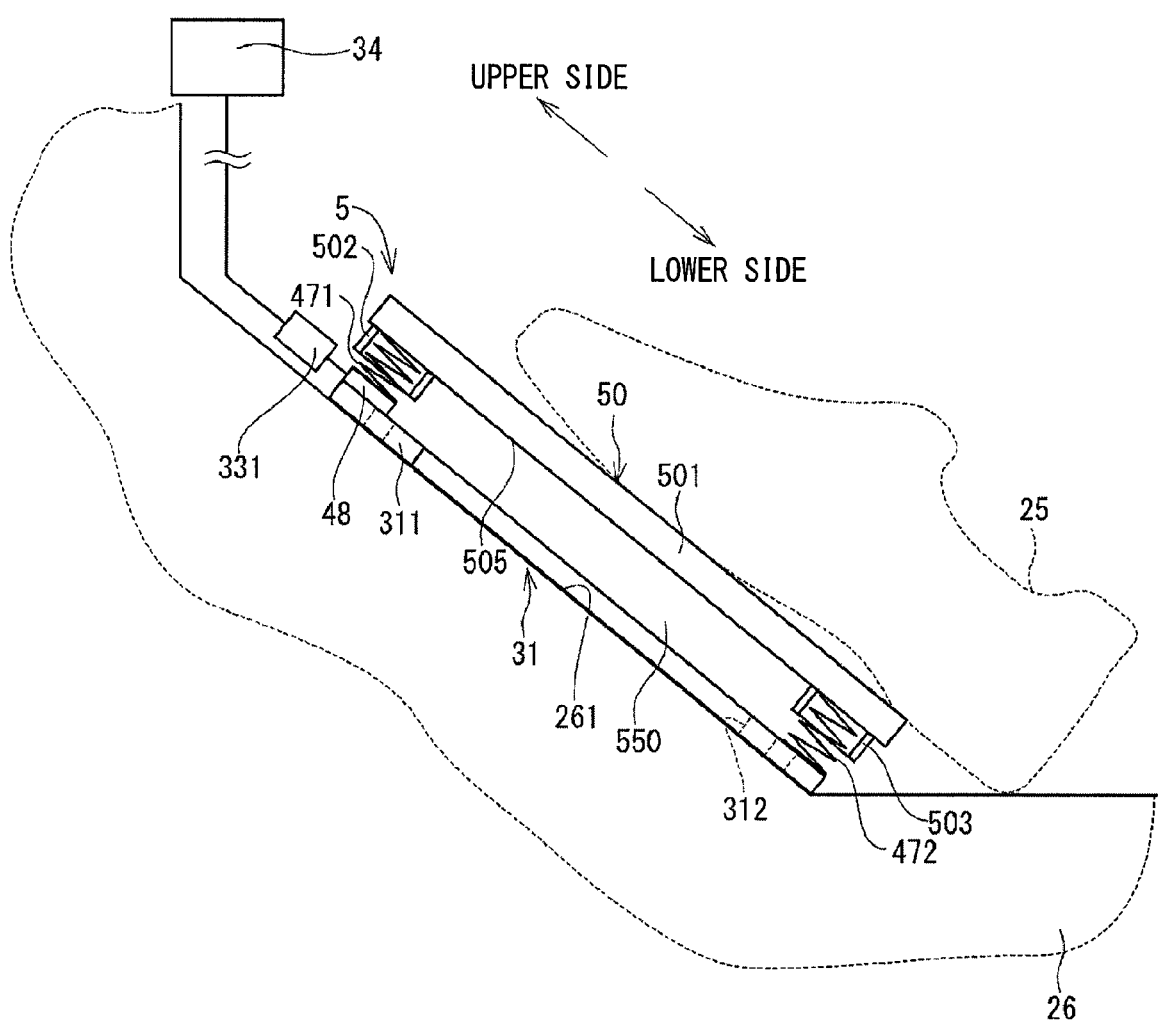
FIG. 8 is a schematic diagram of an accelerator device according to a fifth embodiment of the present disclosure.

Next, a pedal device according to the fifth embodiment of the present disclosure will be described with reference to FIG. 8. The fifth embodiment is different from the fourth embodiment in that a portion capable of guiding expansion and contraction of the spring is provided.

The accelerator device 5 as a "pedal device" according to the fifth embodiment has a pedal pad 50 as a "pedal portion", the base 31, the springs 471 and 472, the displacement amount sensor 48, and the calculating unit 34. Hereinafter, in FIG. 8, a toe side of the driver's foot 25 along an inner wall surface 261 of the vehicle body 26 is referred to as "upper side", and a heel side of the driver's foot 25 is referred to as "lower side".

The pedal pad 50 has a depression portion 501 and pedal side spring guides 502, 503 as "pedal portion side spring guide". The depression portion 501 is formed in a flat plate shape. The depression portion 501 is supported by two springs 471, 472 so that a gap 550 can be formed between the depression portion 451 and the base 31. These springs 471, 472 are provided on the rear surface 505 of the depression portion 451, that is, on the side opposite to the side on which the foot 25 of the driver is placed with respect to the depression portion 501.

The pedal side spring guides 502, 503 are provided on the rear surface 505 of the depression portion 501.

The pedal side spring guide 502 is provided so as to cover an outer periphery of the spring 471. The pedal side spring guide 502 guides the extension and contraction movement of the spring 471.

The pedal side spring guide 503 is provided so as to cover an outer periphery of the spring 472. The pedal side spring guide 503 guides the extension and contraction movement of the spring 472.

In the accelerator device 5 according to the fifth embodiment, when the driver depresses the pedal pad 50, the spring 471 is compressed and deformed in the direction the driver depresses. That is, the magnitude of the pedal effort in the direction in which the driver depresses the pedal pad 50 appears as the displacement amount of the spring 471. As a result, the accelerator device 5 exhibits the effects (A) and (B) of the first embodiment.

(C) Further, in the accelerator device 5 according to the fifth embodiment, the pedal side spring guides 502, 503 capable of guiding the expansion and contraction movement of the springs 471, 472 are provided on the pedal pad 50. As a result, the spring 471 reliably deforms in the direction the driver depresses, so that the displacement amount sensor 48 reliably detects the magnitude of the pedal effort in the direction the driver depresses the pedal pad 50 as the displacement amount of the spring 471. Therefore, it is possible to improve the detection accuracy of the pedal effort.

Sixth Embodiment

Figure 9:
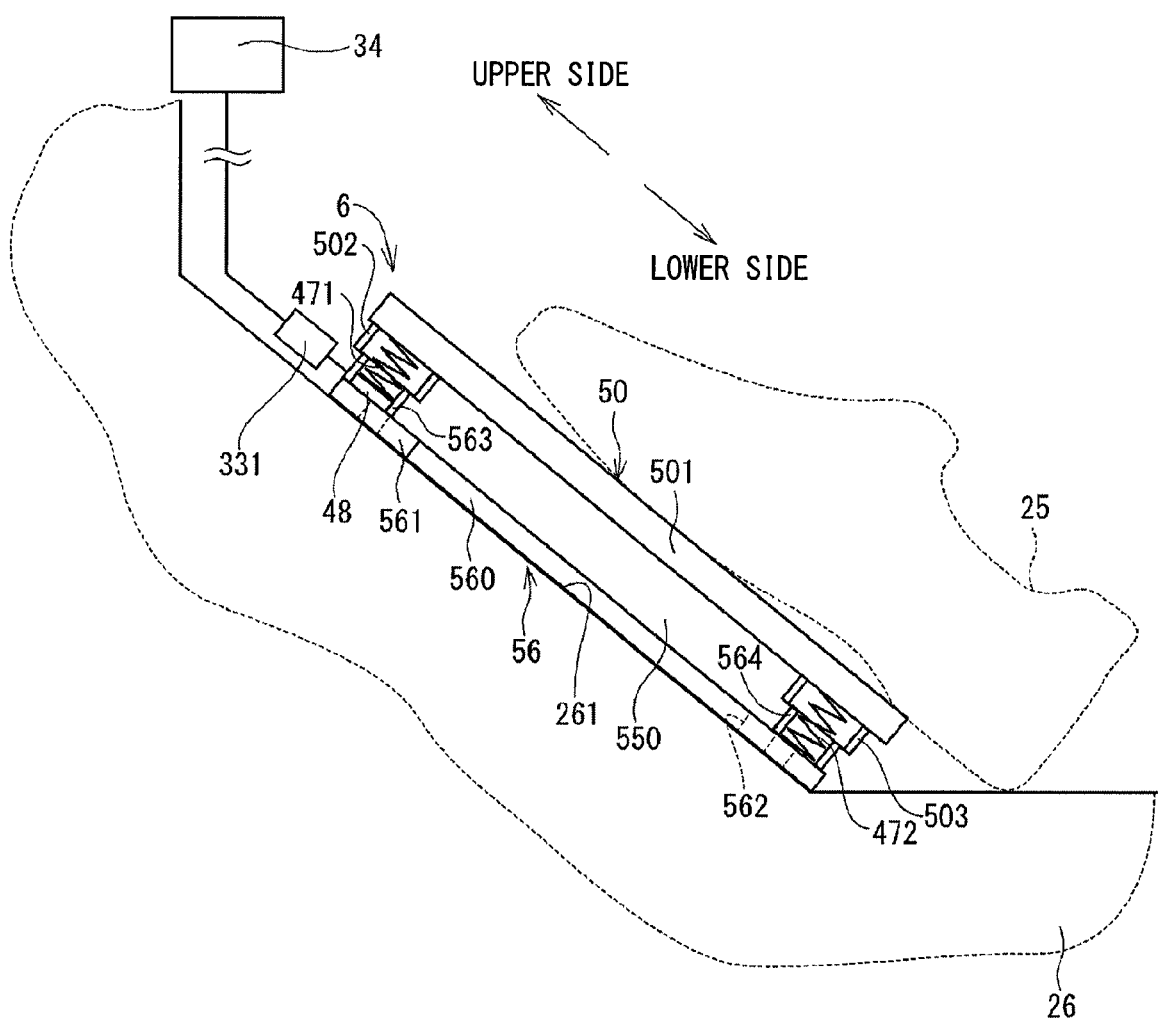
FIG. 9 is a schematic diagram of an accelerator device according to a sixth embodiment of the present disclosure.

Next, a pedal device according to the sixth embodiment of the present disclosure will be described with reference to FIG. 9. The sixth embodiment is different from the fifth embodiment in that a portion capable of guiding expansion and contraction of the spring is provided on the base side.

The accelerator device 6 as a "pedal device" according to the sixth embodiment has the pedal pad 50, a base 56, the springs 471 and 472, the displacement amount sensor 48, and the calculating unit 34. Hereinafter, in FIG. 9, a toe side of the driver's foot 25 along an inner wall surface 261 of the vehicle body 26 is referred to as "upper side", and a heel side of the driver's foot 25 is referred to as "lower side".

The base 56 is a substantially flat plate-like member fixed to an inner wall surface 261 of the vehicle body 26. The base 56 has a base main body 560, fixing portions 561 and 562, and base side spring guides 563 and 564.

The base main body 560 is a flat plate-shaped part. The base main body 560 supports the end opposite to the end side of the springs 471 and 472 supported by the pedal pad 50.

The fixing portion 561 is provided on the upper left side of the base main body 560 as viewed from the direction in which the driver depresses the pedal pad 50. The fixing portion 562 is provided on the upper right side of the base main body 560 as viewed from the direction in which the driver depresses the pedal pad 50. The fixing portions 561 and 562 have screw holes for fixing the base main body 560 to the vehicle body 26.

The base side spring guides 563 and 564 are provided on the pedal pad 50 side with respect to the base main body 560.

The base side spring guide 563 is provided so as to cover the radially outward direction of the spring 471 and an end portion of the base side spring guide 563 on the side opposite to the side connected to the base main body 560 is formed so as to be insertable into the pedal side spring guide 502. The pedal side spring guide 563 guides the extension and contraction movement of the spring 471.

The base side spring guide 564 is provided so as to cover the radially outward direction of the spring 472 and an end portion of the base side spring guide 564 on the side opposite to the side connected to the base main body 560 is formed so as to be insertable into the pedal side spring guide 503. The base side spring guide 564 guides the extension and contraction movement of the spring 472.

Further, in the accelerator device 6 according to the sixth embodiment, the magnitude of the pedal effort in the direction in which the driver depresses the pedal pad 50 appears as the displacement amount of the spring 471. As a result, the accelerator device 6 exhibits the effects (A) and (B) of the first embodiment.

(D) In the accelerator device 6 according to the sixth embodiment, the base 56 has base side spring guides 563 and 564 capable of guiding the expansion and contraction motions of the springs 471 and 472. As a result, the spring 471 is reliably deformed in the direction the driver depresses by the pedal side spring guides 502, 503 of the pedal pad 50 and the base side spring guides 563, 564 of the base 56, so that the displacement amount sensor 48 can reliably detect the magnitude of the pedal effort in the direction in which the driver depresses the pedal pad 50 as the displacement amount of the spring 471. Therefore, it is possible to improve the detection accuracy of the pedal effort.

Seventh Embodiment

Figure 10:
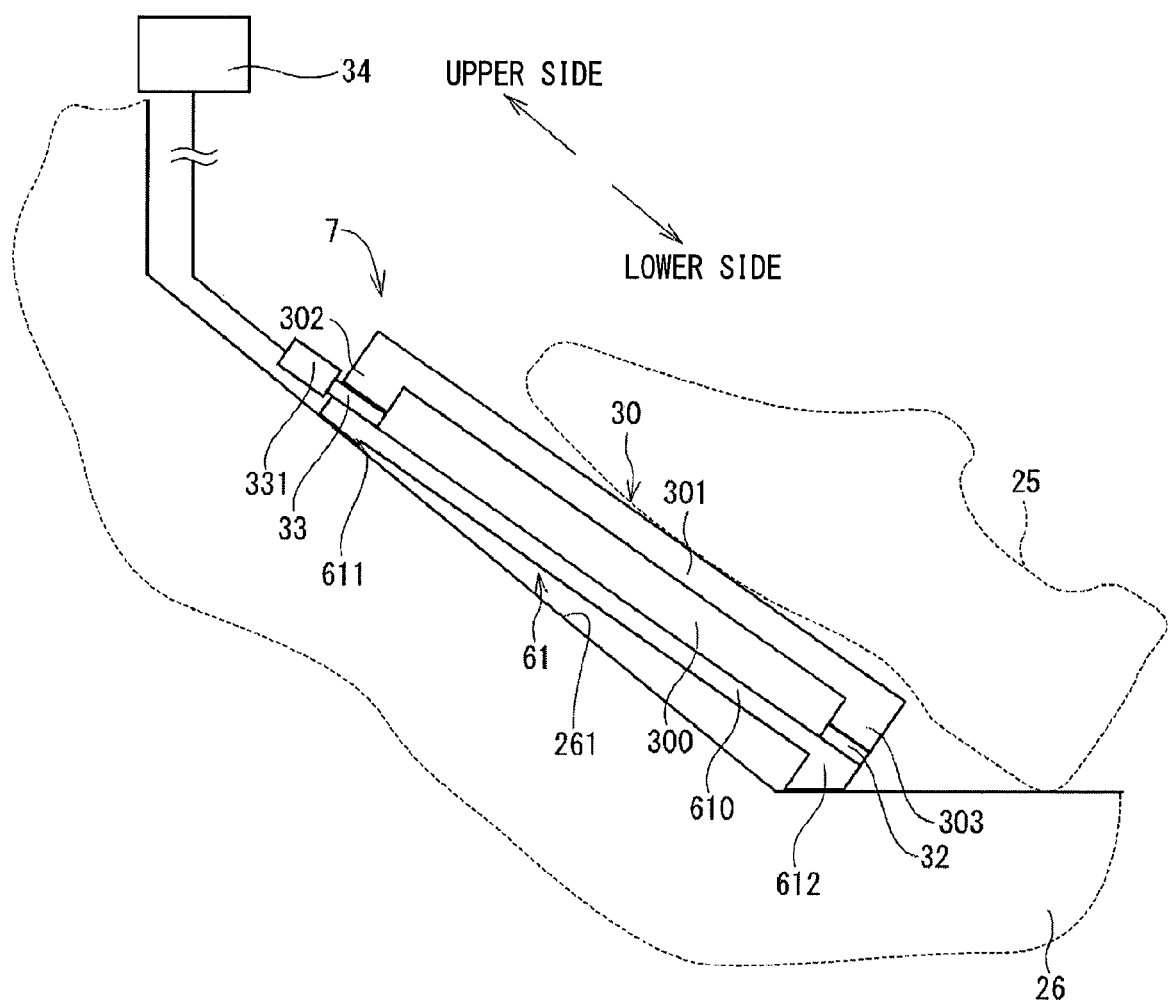
FIG. 10 is a schematic diagram of an accelerator device according to a seventh embodiment of the present disclosure.

Next, a pedal device according to the seventh embodiment of the present disclosure will be described with reference to FIG. 10. The seventh embodiment is different from the first embodiment in the shape of the base.

The accelerator device 7 as a "pedal device" according to the seventh embodiment has the pedal pad 30, a base 61, the elastic support portion 32, the displacement amount sensor 33, and the calculating unit 34. Hereinafter, in FIG. 10, a toe side of the driver's foot 25 along an inner wall surface 261 of the vehicle body 26 is referred to as "upper side", and a heel side of the driver's foot 25 is referred to as "lower side".

The base 61 is a substantially flat plate-like member fixed to an inner wall surface 261 of the vehicle body 26. The base 61 has a base main body 610 and leg portions 611, 612.

The base main body 610 is a flat plate-shaped part.

The leg portions 611 and 612 are provided on the side of the base main body 610 opposed to the inner wall surface 261 of the vehicle body 26.

The leg portion 611 is provided on the upper side of the base main body 610. The leg portion 611 is fixed to the inner wall surface 261.

The leg portion 612 is provided on the lower side of the base main body 610. The leg portion 612 is fixed to the inner wall surface 261. The leg portion 612 is longer in length than the leg portion 611. As a result, as shown in FIG. 10, the base main body 610 is provided so as to be separated from the inner wall surface 261 from the upper side to the lower side of the base main body 610. That is, in the seventh embodiment, the depression portion 301 is also provided so as to be separated from the inner wall surface 261 from the upper side to the lower side of the depression portion 301.

In the accelerator device 7 according to the seventh embodiment, the magnitude of the pedal effort in the direction in which the driver depresses the pedal pad 30 appears as the displacement amount of the displacement amount sensor 33. As a result, the accelerator device 7 exhibits the effects (A) and (B) of the first embodiment.

(E) In the accelerator device 7 according to the seventh embodiment, the angle of the depression portion 301 with respect to the inner wall surface 261 is changed by making the length of the leg portion 611 different from the length of the leg portion 612. Thereby, it is possible to provide the depression portion 301 at a position and an angle that are easy for the driver to depress. Therefore, it is possible to accurately detect the pedal effort in the direction in which the driver depresses the pedal pad 30.

Eighth Embodiment

Figure 11:
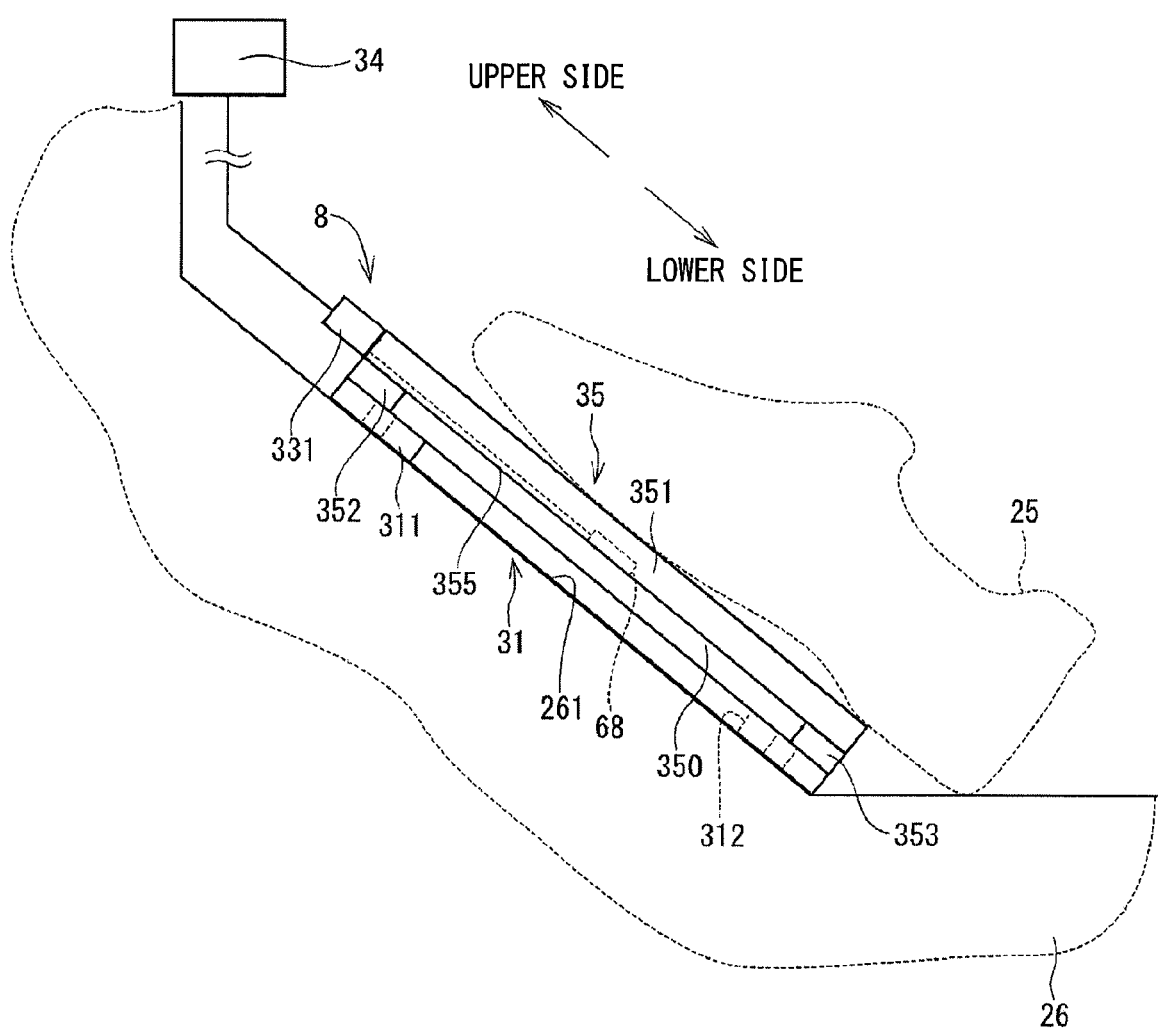
FIG. 11 is a schematic diagram of an accelerator device according to an eighth embodiment of the present disclosure.

Next, a pedal device according to the eighth embodiment of the present disclosure will be described with reference to FIG. 11. The eighth embodiment is different from the second embodiment in the position where the strain gauge is provided.

The accelerator device 8 as the "pedal device" according to the eighth embodiment has the pedal pad 35, the base 31, a strain gauge 68 as a "pedal effort detecting portion", and the calculating unit 34. Hereinafter, in FIG. 11, a toe side of the driver's foot 25 along an inner wall surface 261 of the vehicle body 26 is referred to as "upper side", and a heel side of the driver's foot 25 is referred to as "lower side".

The strain gauge 68 is provided substantially at the center of the rear surface 355 on the side opposite to the side on which the foot of the driver is placed with respect to the depression portion 351. The strain gauge 68 is capable of detecting the amount of displacement of the depression portion 351. The strain gauge 68 outputs an electric signal corresponding to the magnitude of the displacement amount of the depression portion 351 to the calculating unit 34 which is electrically connected via the connector 331.

The calculating unit 34 is electrically connected to the strain gauge 68 via the connector 331.

In the accelerator device 8 according to the eight embodiment, the magnitude of the pedal effort in the direction in which the driver depresses the pedal pad 35 appears as the displacement amount of the depression portion 351. As a result, the accelerator device 8 exhibits the effects (A) and (B) of the first embodiment.

(F) In the accelerator device 8 according to the eighth embodiment, the strain gauge 68 is provided on the rear surface 355 of the depression portion 351. Thereby, it is possible to prevent the strain gauge 68 from contacting the driver's foot 25. Therefore, it is possible to prevent detection error due to contact with the driver's foot 25.

Further, in the case where the strain gauge 68 is provided on the rear surface 355, the strain gauge 68 can be provided substantially at the center where the displacement amount of the depression portion 351 is relatively large, so that the detection accuracy of the displacement amount of the depression portion 351 can be improved. Therefore, it is possible to improve the detection accuracy of the pedal effort.

Ninth Embodiment

Figure 12:
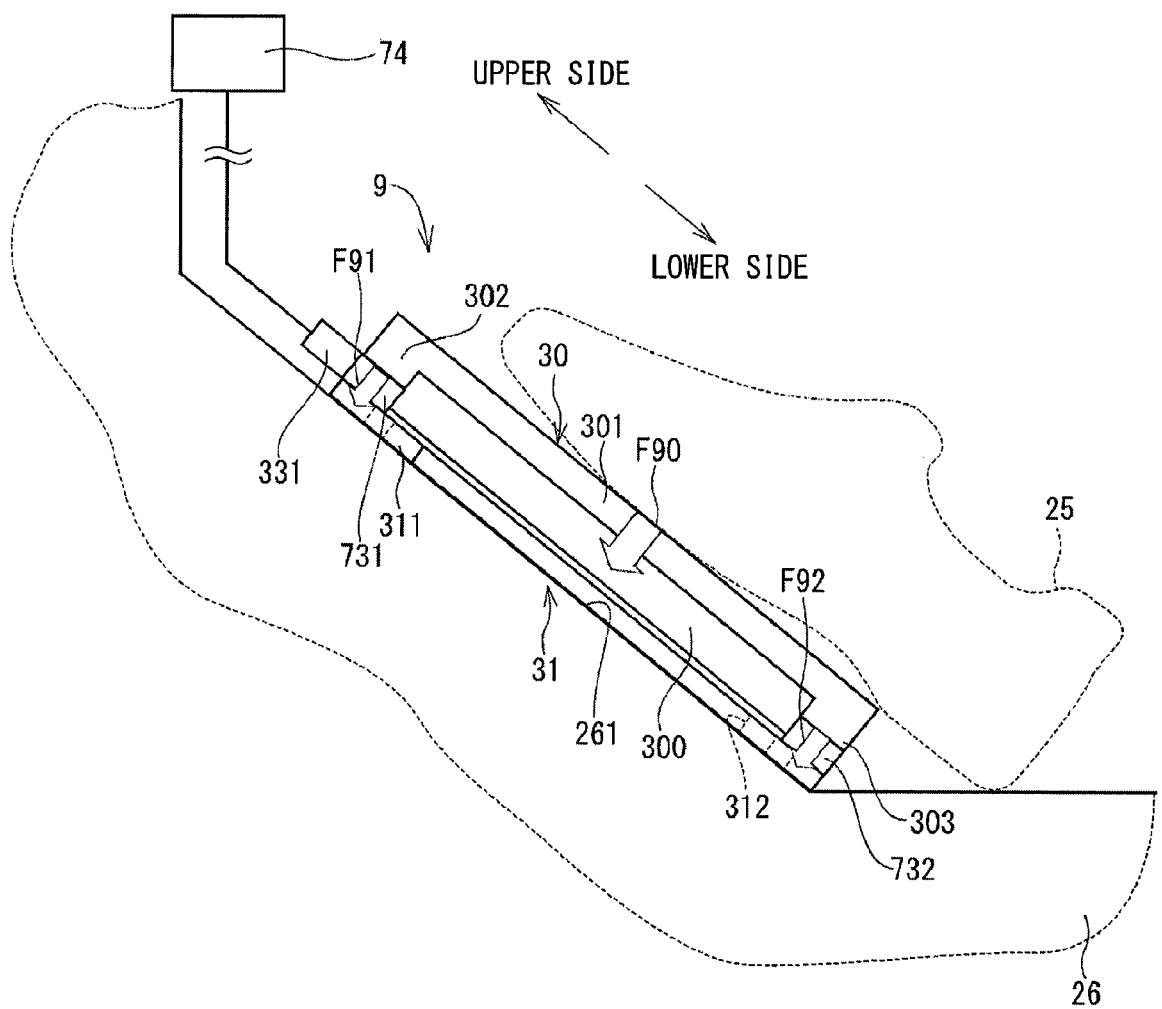
FIG. 12 is a schematic diagram of an accelerator device according to a ninth embodiment of the present disclosure.

Next, a pedal device according to the ninth embodiment of the present disclosure will be described with reference to FIG. 12. The ninth embodiment is different from the first embodiment in that a pressure sensor is provided.

The accelerator device 9 as the "pedal device" according to the ninth embodiment has the pedal pad 30, the base 31, pressure sensors 731, 732 as a "pedal effort detecting portion", and the calculating unit 74 as a "pedal effort detecting portion". Hereinafter, in FIG. 12, a toe side of the driver's foot 25 along an inner wall surface 261 of the vehicle body 26 is referred to as "upper side", and a heel side of the driver's foot 25 is referred to as "lower side".

The pressure sensors 731, 732 are, for example, piezoelectric elements and are provided between the pedal pad 30 and the base 31.

The pressure sensor 731 is provided between the leg portion 302 and the base 31. The pressure sensor 731 can detect the magnitude of pressure acting on itself. The pressure sensor 731 outputs an electric signal corresponding to the magnitude of the pressure to a calculating unit 74 electrically connected via the connector 331.

The pressure sensor 732 is provided between the leg portion 303 and the base 31. The pressure sensor 732 can detect the magnitude of pressure acting on itself. The pressure sensor 732 is electrically connected to the calculating unit 74 via the connector 331. The pressure sensor 732 outputs an electric signal corresponding to the magnitude of the pressure to the calculating unit 74 electrically connected via the connector 331.

That is, in the ninth embodiment, two electric signals are outputted to the calculating unit 74.

The calculating unit 74 calculates the displacement amount of the pedal pad 30 based on the two electric signals output from the pressure sensors 731 and 732. At this time, the calculating unit 74 calculates the average value of the two pressures calculated based on the two electric signals as the pressure acting on the pedal pad 35. The calculating unit 74 calculates the pedal effort of the driver based on the calculated pressure applied to the pedal pad 30. The calculated pedal effort is transmitted to the electronic control device.

In the accelerator device 9, when the driver depresses the pedal pad 30, a pedal effort (a hollow arrow F90 in FIG. 12) in the direction in which the driver depresses the pedal pad 30 acts. The pedal effort acting on the pedal pad 30 acts on the pressure sensors 731, 732. The pressure sensors 731, 732 detect the pressure (hollow arrows F91, F92 in FIG. 12) applied to the pressure sensors 731, 732, and transmit an electric signal corresponding to the pressure to the calculating unit 74 via the connector 331. The calculating unit 74 calculates the pedal effort by the driver based on the electric signal outputted by the pressure sensors 731, 732 and outputs the electric signal corresponding to the pedal effort to the electronic control device.

In the accelerator device 9 according to the ninth embodiment, when the driver depresses the pedal pad 30, the pressure acting on the pressure sensors 731, 732 from the pedal pad 30 is calculated as the pedal effort in the depression direction of the driver. As a result, the accelerator device 9 exhibits the effects (A) and (B) of the first embodiment.

(G) In the accelerator device 9 according to the ninth embodiment, the average value of the pressures detected by the two pressure sensors 731, 732 is regarded as the pedal effort acting on the pedal pad 35. As a result, even if the driver depresses the pedal pad 30 in different ways, it is possible to calculate the pedal effort of the depression. Thus, the detection accuracy of the driver's pedal effort can be improved.

Tenth Embodiment

Figure 13:
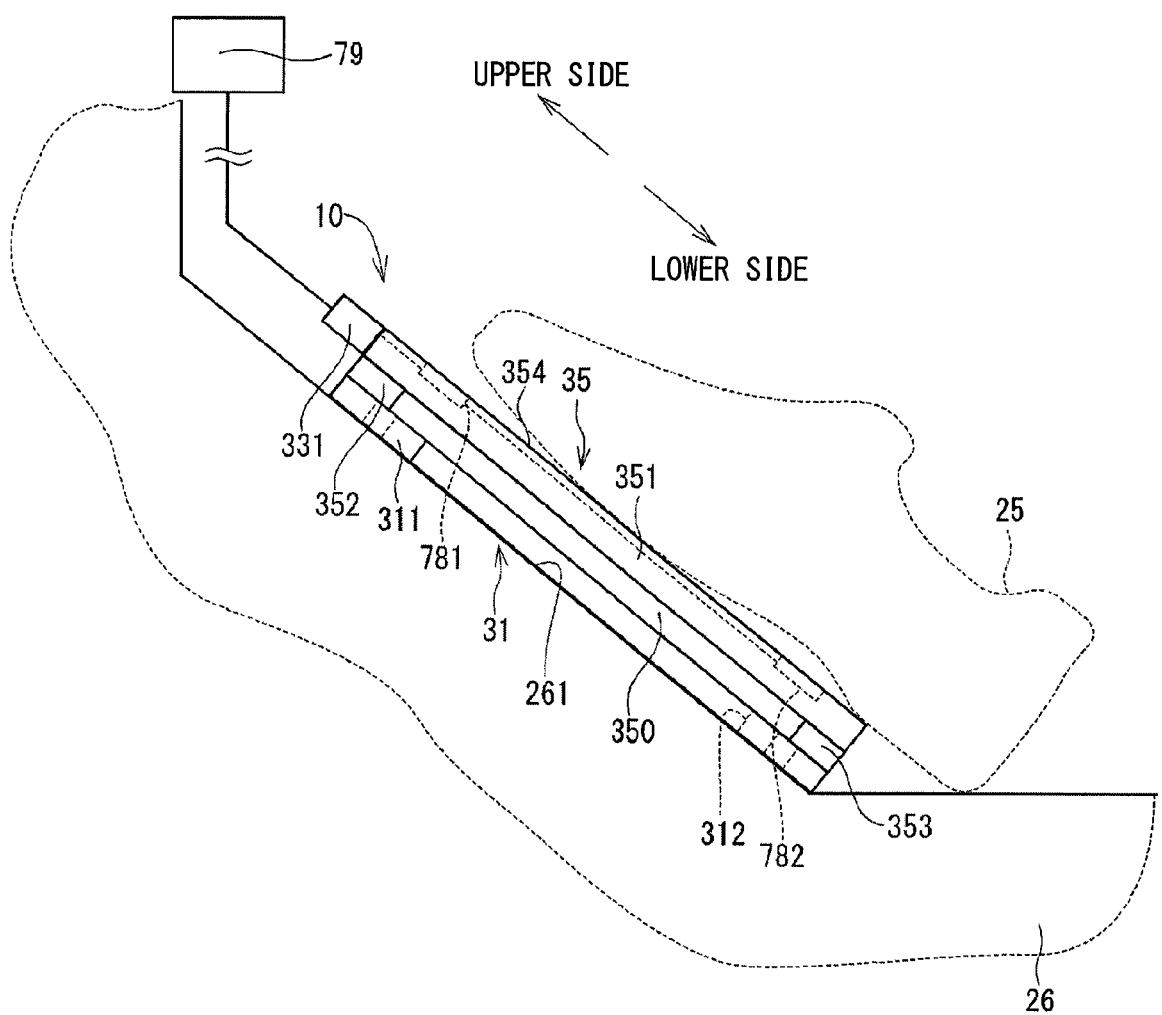
FIG. 13 is a schematic diagram of an accelerator device according to a tenth embodiment of the present disclosure.

Next, a pedal device according to the tenth embodiment of the present disclosure will be described with reference to FIG. 13. The tenth embodiment is different from the first embodiment in that a plurality of strain gauges are provided.

The accelerator device 10 as the "pedal device" according to the tenth embodiment has the pedal pad 35, the base 31, strain gauges 781, 782 as a "pedal effort detecting portion", and the calculating unit 79 as a "pedal effort detecting portion". Hereinafter, in FIG. 13, a toe side of the driver's foot 25 along an inner wall surface 261 of the vehicle body 26 is referred to as "upper side", and a heel side of the driver's foot 25 is referred to as "lower side".

The strain gauges 781 and 782 are provided on a surface 354 of the depression portion 351, which is the side on which the driver's foot is placed. The strain gauge 781 is provided on the upper side of the depression portion 351. The strain gauge 782 is provided on the lower side of the depression portion 351. In the accelerator device 10, the strain gauges 781 and 782 can detect the displacement amount of the depression portion 351. The strain gauges 781 and 782 outputs an electric signal corresponding to the magnitude of the displacement amount of the depression portion 351 to the calculating unit 79 which is electrically connected via the connector 331. That is, in the accelerator device 10, two electric signals are outputted to the calculating unit 79.

The calculating unit 79 calculates the displacement amount of the pedal pad 35 based on the two electric signals output from the strain gauges 781 and 782. At this time, the calculating unit 79 calculates the maximum value of the two displacement amounts calculated based on the two electric signals as the displacement amount of the pedal pad 35. The calculating unit 79 calculates the pedal effort of the driver based on the maximum value of two calculated displacement amounts. The calculated pedal effort is transmitted to the electronic control device.

In the accelerator device 10 according to the tenth embodiment, when the driver depresses the pedal pad 35, the displacement amount of the pedal pad 35 detected by the strain gauges 781, 782 is calculated as the pedal effort in the depression direction of the driver. As a result, the accelerator device 10 exhibits the effects (A) and (B) of the first embodiment.

(H) In the accelerator device 10 according to the tenth embodiment, the maximum value of the displacement amount of the pedal pad 35 at the position where the two strain gauges 781, 782 are provided is set as the displacement amount of the pedal pad 35. As a result, deformation of the pedal pad 35 can be detected by deforming any one of the two strain gauges 781, 782, and the pedal effort of the driver can be calculated according to the magnitude of the deformation. Even when deformation of the pedal pad 35 can not be detected with one strain gauge due to a working condition of the driver's foot 25 to the pedal pad 35, the deformation can be detected by another strain gauge. Thus, the detection accuracy of the driver's pedal effort can be improved.

Eleventh Embodiment

Figure 14:
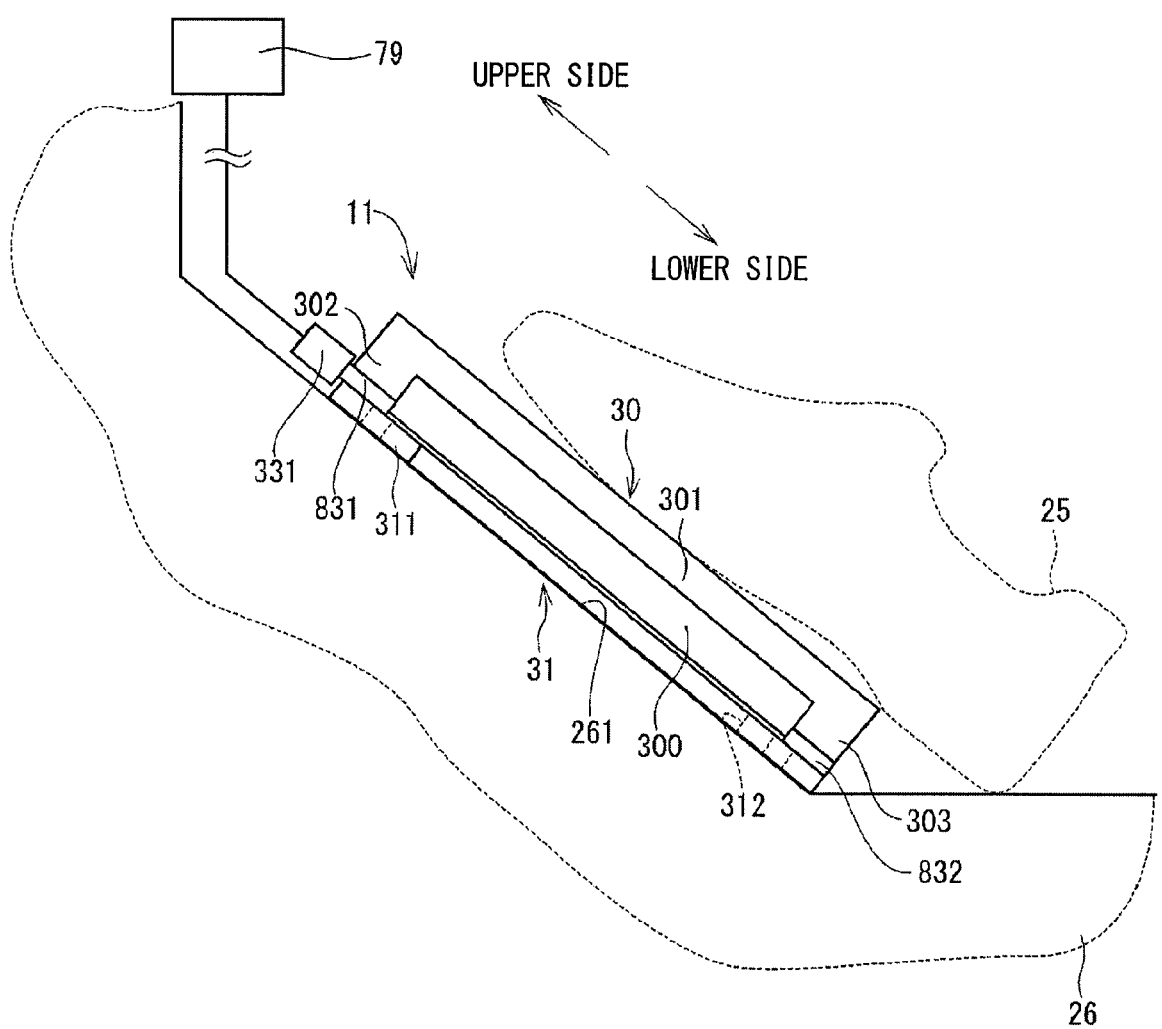
FIG. 14 is a schematic diagram of an accelerator device according to an eleventh embodiment of the present disclosure.

Next, a pedal device according to the eleventh embodiment of the present disclosure will be described with reference to FIG. 14. The eleventh embodiment is different from the first embodiment in that a plurality of displacement amount sensors are provided.

The accelerator device 11 as a "pedal device" according to the eleventh embodiment has the pedal pad 30, the base 31, the springs 471 and 472, displacement amount sensors 831 and 832 as a "pedal effort detecting portion", and the calculating unit 79. Hereinafter, in FIG. 14, a toe side of the driver's foot 25 along an inner wall surface 261 of the vehicle body 26 is referred to as "upper side", and a heel side of the driver's foot 25 is referred to as "lower side".

The displacement amount sensors 831 and 832 are provided on the base 31 side of the pedal pad 30.

The displacement amount sensor 831 is provided between the leg portion 302 of the pedal pad 30 and the base 31. The displacement amount sensor 831 is, for example, a conductive member having elasticity, and is formed so as to be deformable when the driver depresses the pedal pad 30. The displacement amount sensor 831 can output an electric signal corresponding to its own electrical resistance when the driver depresses the pedal pad 30 to the calculating unit 79 electrically connecting via the connector 331.

The displacement amount sensor 832 is provided between the leg portion 303 of the pedal pad 30 and the base 31. The displacement amount sensor 832 is, for example, a conductive member having elasticity, and is formed so as to be deformable when the driver depresses the pedal pad 30. The displacement amount sensor 832 can output an electric signal corresponding to its own electric resistance when the driver depresses the pedal pad 30 to the calculating unit 79 electrically connecting via the connector 331.

That is, in the eleventh embodiment, two electric signals are outputted to the calculating unit 79.

The calculating unit 79 calculates the displacement amount of the pedal pad 30 based on an electric signal corresponding to the electric resistance of itself output from the displacement amount sensors 831 and 832. At this time, the calculating unit 79 calculates the maximum value of the two displacement amounts calculated based on the two electric signals as the displacement amount of the pedal pad 30. The calculating unit 79 calculates the pedal effort of the driver based on the maximum value of two calculated displacement amounts. The calculated pedal effort is transmitted to the electronic control device.

In the accelerator device 11 according to the eleventh embodiment, the magnitude of the pedal effort in the direction in which the driver depresses the pedal pad 30 appears as the displacement amount of the displacement amount sensor 831 and 832. As a result, the accelerator device 11 exhibits the effects (A) and (B) of the first embodiment.

Further, in the accelerator device 11 according to the eleventh embodiment, the pedal effort of the driver is calculated based on the displacement amounts of the two displacement amount sensors 831 and 832. Thereby, the eleventh embodiment exhibits the effect (H) of the tenth embodiment.

Twelfth Embodiment

Figure 15:
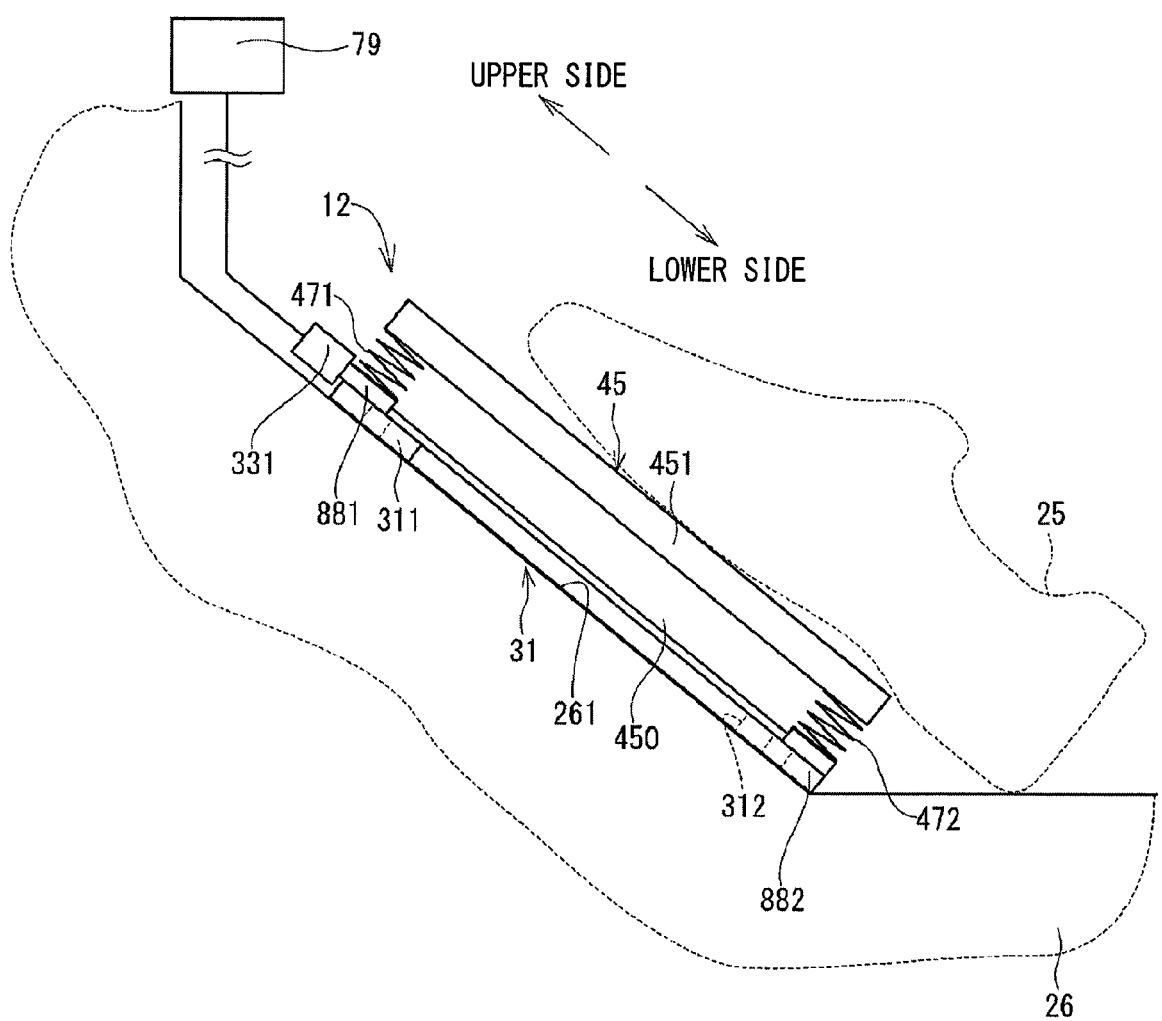
FIG. 15 is a schematic diagram of an accelerator device according to a twelfth embodiment of the present disclosure.

Next, a pedal device according to the twelfth embodiment of the present disclosure will be described with reference to FIG. 15. The twelfth embodiment is different from the first embodiment in that a plurality of displacement amount sensors are provided for each of a plurality of springs.

The accelerator device 12 as a "pedal device" according to the twelfth embodiment has the pedal pad 45, the base 31, the springs 471 and 472, displacement amount sensors 881 and 882 as a "pedal effort detecting portion", and the calculating unit 79. Hereinafter, in FIG. 15, a toe side of the driver's foot 25 along an inner wall surface 261 of the vehicle body 26 is referred to as "upper side", and a heel side of the driver's foot 25 is referred to as "lower side".

The displacement amount sensor 881 is provided between the spring 471 and the base 31. The displacement amount sensor 881 is capable of detecting the displacement amount of the spring 471. The displacement amount sensor 881 can output an electric signal corresponding to the displacement amount of the spring 471 to the calculating unit 79 electrically connected via the connector 331.

The displacement amount sensor 882 is provided between the spring 472 and the base 31. The displacement amount sensor 882 is capable of detecting the displacement amount of the spring 472. The displacement amount sensor 882 can output an electric signal corresponding to the displacement amount of the spring 472 to the calculating unit 79 electrically connected via the connector 331.

That is, in the twelfth embodiment, two electric signals are outputted to the calculating unit 79.

The calculating unit 79 calculates the displacement amount of the pedal pad 45 based on the electric signal corresponding to the magnitude of the displacement amount of the springs 471 and 472 output by the displacement amount sensors 881 and 882. At this time, the calculating unit 79 calculates the maximum value of the two displacement amounts calculated based on the two electric signals as the displacement amount of the pedal pad 45. The calculating unit 79 calculates the pedal effort of the driver based on the maximum value of two calculated displacement amounts. The calculated pedal effort is transmitted to the electronic control device.

In the accelerator device 12 according to the twelfth embodiment, the magnitude of the pedal effort in the direction in which the driver depresses the pedal pad 45 appears as the displacement amount of the springs 471 and 472. As a result, the accelerator device 12 exhibits the effects (A) and (B) of the first embodiment.

Further, in the accelerator device 12, the pedal effort of the driver is calculated based on the displacement amounts of the two springs 471 and 472. Thereby, the twelfth embodiment exhibits the effect (H) of the tenth embodiment.

Thirteenth Embodiment

Figure 16:
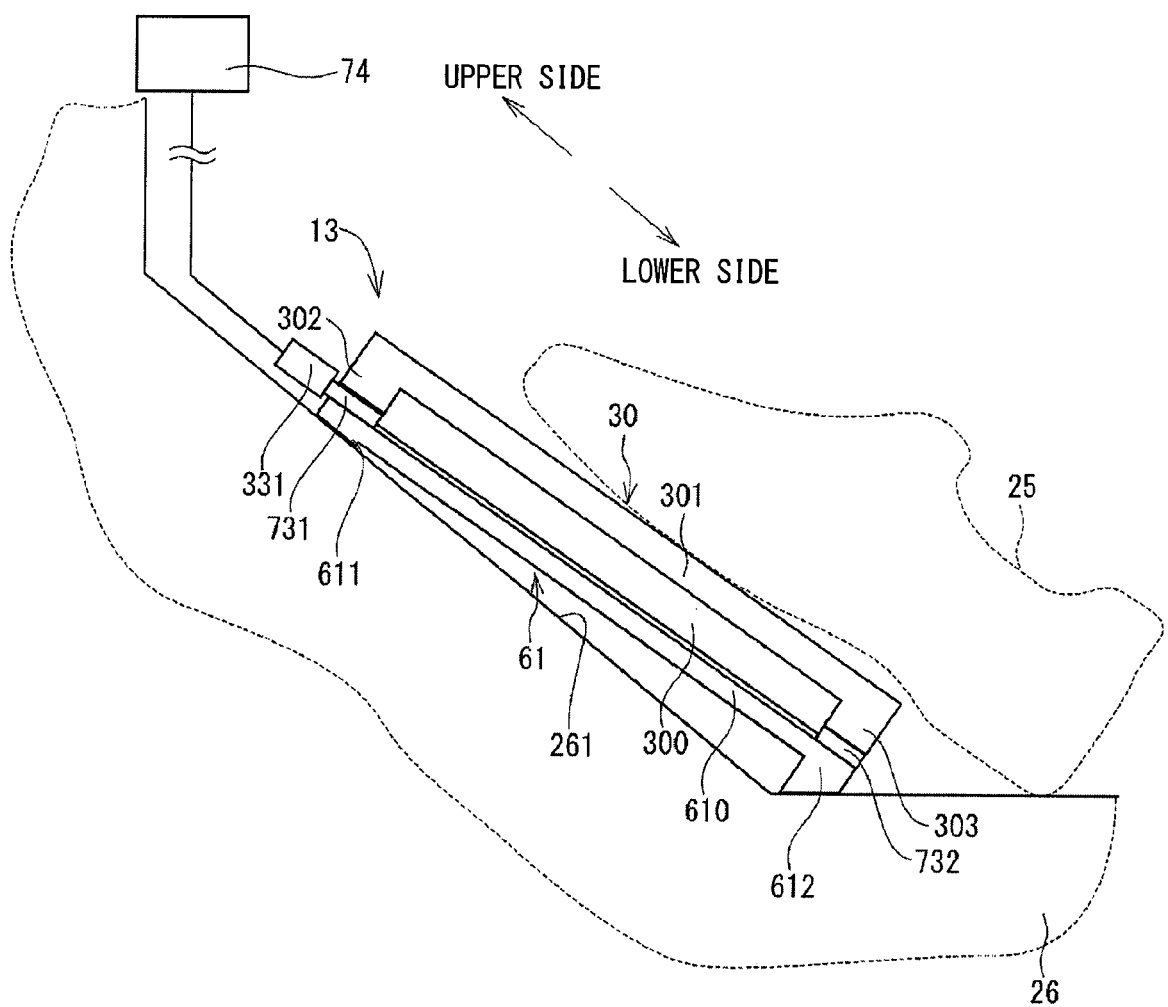
FIG. 16 is a schematic diagram of an accelerator device according to a thirteenth embodiment of the present disclosure.

Next, a pedal device according to the thirteenth embodiment of the present disclosure will be described with reference to FIG. 16. The thirteenth embodiment is different from the ninth embodiment in the shape of the base.

The accelerator device 13 as a "pedal device" according to the thirteenth embodiment has the pedal pad 30, a base 61, the pressure sensors 731 and 732, and the calculating unit 74. Hereinafter, in FIG. 16, a toe side of the driver's foot 25 along an inner wall surface 261 of the vehicle body 26 is referred to as "upper side", and a heel side of the driver's foot 25 is referred to as "lower side".

In the accelerator device 13 according to the thirteenth embodiment, when the driver depresses the pedal pad 30, the pressure acting on the pressure sensors 731, 732 from the pedal pad 30 is calculated as the pedal effort in the depression direction of the driver. As a result, the accelerator device 13 exhibits the effects (A) and (B) in the first embodiment.

In the accelerator device 13 according to the thirteenth embodiment, the average value of the pressures detected by the two pressure sensors 731, 732 is regarded as the pedal effort acting on the pedal pad 30. Thereby, the accelerator device 13 exhibits the effect (G) of the ninth embodiment.

In the accelerator device 13 according to the thirteenth embodiment, the angle of the depression portion 301 with respect to the inner wall surface 261 is changed by making the length of the leg portion 611 different from the length of the leg portion 612. As a result, the accelerator device 13 exhibits the effect (E) of the seventh embodiment.

Fourteenth Embodiment

Figure 17:
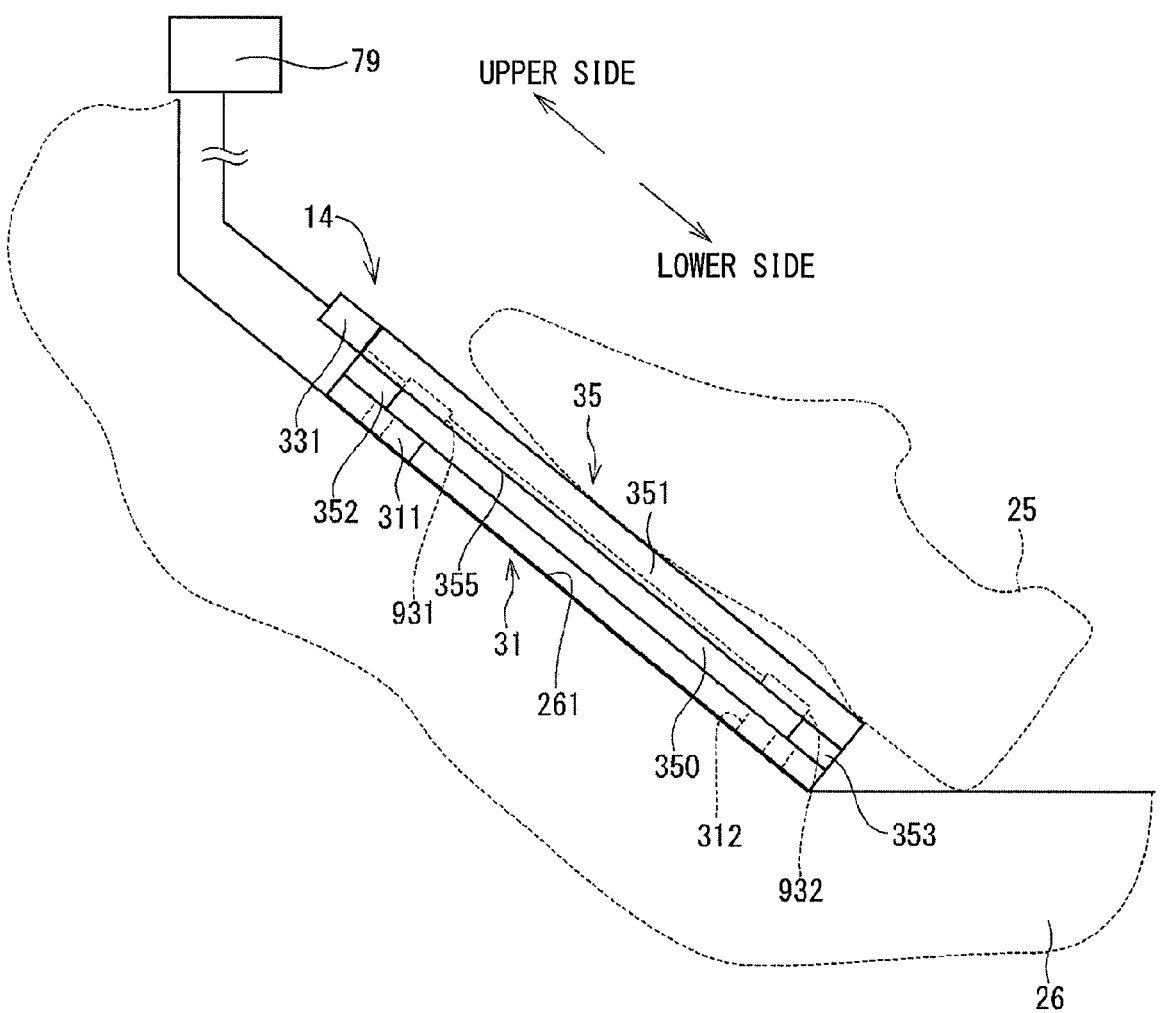
FIG. 17 is a schematic diagram of an accelerator device according to a fourteenth embodiment of the present disclosure.

Next, a pedal device according to the fourteenth embodiment of the present disclosure will be described with reference to FIG. 17. The fourteenth embodiment is different from the eighth embodiment in that a plurality of strain gauges are provided.

The accelerator device 14 as the "pedal device" according to the fourteenth embodiment has the pedal pad 35, the base 31, strain gauges 931 and 932 as a "pedal effort detecting portion", and the calculating unit 79. Hereinafter, in FIG. 17, a toe side of the driver's foot 25 along an inner wall surface 261 of the vehicle body 26 is referred to as "upper side", and a heel side of the driver's foot 25 is referred to as "lower side".

The strain gauges 931 and 932 are provided on the rear surface 355 of the depression portion 351.

The strain gauge 931 is provided on the upper side of the depression portion 351. The strain gauge 931 is capable of detecting the amount of displacement of the depression portion 351. The strain gauge 931 outputs an electric signal corresponding to the magnitude of the displacement amount of the depression portion 351 to the calculating unit 79 which is electrically connected via the connector 331.

The strain gauge 932 is provided on the lower side of the depression portion 351. The strain gauge 932 is capable of detecting the amount of displacement of the depression portion 351. The strain gauge 932 outputs an electric signal corresponding to the magnitude of the displacement amount of the depression portion 351 to the calculating unit 79 which is electrically connected via the connector 331.

That is, in the fourteenth embodiment, two electric signals are outputted to the calculating unit 79.

In the accelerator device 14 according to the fourteenth embodiment, the magnitude of the pedal effort in the direction in which the driver depresses the pedal pad 35 appears as the displacement amount of the depression portion 351. As a result, the accelerator device 14 exhibits the effects (A) and (B) of the first embodiment.

In the accelerator device 14 according to the fourteenth embodiment, the strain gauges 931 and 932 are provided on the rear surface 355 of the depression portion 351. As a result, the accelerator device 14 exhibits the effect (F) of the eighth embodiment.

In the accelerator device 14 according to the fourteenth embodiment, the pedal effort of the driver is calculated based on the amount of displacement of the depression portion 351 detected by the two strain gauges 931, 932. Thereby, the fourteenth embodiment exhibits the effect (H) of the tenth embodiment.

Other Embodiments

In the above embodiment, the "pedal device" is an accelerator device for controlling the driving of the throttle valve of the vehicle. However, the field to which the "pedal device" of the present disclosure is applied is not limited to this field. For example, it may be applied to the operation of a brake or a clutch, and it can be applied to a field where various driving is controlled depending on the depression amount of the foot of the operator.

In the embodiment described above, the pedal pad is provided on the base. However, it is not necessary to have the base.

In the embodiment described above, the pedal pad is supported on both the upper side and the lower side of the pedal pad. However, the place to support the pedal pad is not limited to this configuration. The pedal pas may be supported at plural places.

In the first embodiment, it is assumed that when the driver depresses the pedal pad, the elastic support portion and the displacement amount sensor are deformed, and the pedal pad moves substantially in parallel with along the depression direction of the driver. However, the elastic support portion may be omitted.

In the first, seventh and eleventh embodiments, it is assumed that the displacement amount sensor can output an electric signal corresponding to its own electric resistance. In the third embodiment, the displacement amount sensor detects the displacement amount of the deformable portion and outputs an electric signal corresponding to the displacement amount of the deformable portion. In the fourth to sixth and twelfth embodiments, the displacement amount sensor detects the displacement amount of the spring and outputs an electric signal corresponding to the displacement amount of the spring. However, the displacement amount sensor may be deformed by the pressure at which the pedal pad or the deformable portion acts on the displacement amount sensor, and may be capable of detecting the displacement amount of the deformation.

In the third embodiment, the accelerator device has one deformable portion. In the fourth, fifth, sixth and twelfth embodiments, the accelerator device has two springs. However, the number of "deformable portions" is not limited to these configurations.

In the tenth and fourteenth embodiments, the accelerator device has two strain gauges. The accelerator device may have three or more strain gauges.

In the ninth and thirteenth embodiments, the accelerator device has two pressure sensors. The accelerator device may have three or more pressure sensors.

The base according to the seventh and thirteenth embodiments may be applied to that of the second to sixth, eighth to twelfth and fourteenth embodiments.

In the above-described embodiment, the calculating unit uses the maximum value of the two displacement amounts calculated based on the two electric signals as the displacement amount of the pedal pad, and calculates the pedal effort based on the maximum value of the two calculated displacement amounts. However, the calculation content in the calculating unit is not limited to this configuration. The average value of the two displacement amounts calculated based on the two electric signals may be regarded as the displacement amount of the pedal pad and calculates the pedal effort of the driver based on the average value of the two calculated displacement amounts. In addition, the calculation method in the calculating unit is not limited to this method.

The present disclosure should not be limited to the embodiments described above, and various other embodiments may be implemented without departing from the scope of the present disclosure.

The present disclosure has been described in accordance with embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

In the pedal device of the present disclosure, when the operator depresses the pedal portion, the pedal effort detecting portion detects the magnitude of the pedal effort in the depression direction. According to the pedal device of the present disclosure, even if the direction in which the operator depresses the pedal portion is different depending on situations, it is possible to reliably detect the pedal effort in the direction the operator depressed. Therefore, the pedal device of the present disclosure can reliably detect the operated amount of the pedal portion by the operator. Since the magnitude of the pedal effort in the depression direction is detected by the pedal effort detecting portion, it is possible to operate the pedal portion with a relatively small stroke both in case of normal and emergency. Therefore, it is possible to quickly operate the pedal portion in case of emergency.

The invention claimed is:

1. A pedal device, comprising:
a pedal portion which an operator depresses;
a base configured to support the pedal portion; and
a pedal effort detecting portion being configured to detect magnitude of the pedal effort in a depression direction when the operator depresses the pedal portion and being configured to output a signal corresponding to the magnitude of the pedal effort to outside, wherein
the pedal effort detecting portion includes at least one piezoelectric element provided so as to detect a pressure acting on the pedal portion, and being configured to output the signal, the signal corresponding to the magnitude of the detected pressure, and a calculating unit configured to calculate the magnitude of the pedal effort based on the signal output from the at least one piezoelectric element; and
the at least one piezoelectric element is located between the base and the pedal portion, and is sandwiched on a distal end side of the pedal portion such that the at least one piezoelectric element contacts the base and the pedal portion.

2. The pedal device according to claim 1, wherein
the at least one piezoelectric element is comprised of a plurality of piezoelectric elements.

3. The pedal device according to claim 2, wherein
the calculating unit sets an average value or a maximum value of the magnitude of the displacement amount of the pedal portion indicated by each of the plurality of signals as sent by the plurality of piezoelectric elements as the magnitude of the pedal effort.

4. The pedal device according to claim 1, wherein
the pedal effort detecting portion further includes the at least one piezoelectric element another piezoelectric element, and the another piezoelectric element is sandwiched between the base and the pedal portion at a rear end side of the pedal portion which is positioned opposite to the distal end side of the pedal portion.

5. The pedal device according to claim 4, wherein
the pressure acting on the pedal portion is calculated based on respective electric signals output from the at least one piezoelectric element and the another piezoelectric element.

6. A pedal device, comprising:
a pedal portion which an operator depresses;
a base configured to support the pedal portion; and
a pedal effort detecting portion being configured to detect magnitude of the pedal effort in a depression direction when the operator depresses the pedal portion and being configured to output a signal corresponding to the magnitude of the pedal effort to outside, wherein
the pedal effort detecting portion includes at least one displacement amount sensor provided so as to detect a displacement amount of the pedal portion, and being configured to output a signal corresponding to the magnitude of the detected displacement amount, and a calculating unit configured to calculate the magnitude of the pedal effort based on the signal output from the at least one displacement amount sensor,
the at least one displacement amount sensor detects a pressure acting on the pedal portion, and outputs a signal according to the magnitude of the detected pressure, and
the at least one displacement amount sensor is located between the base and the pedal portion, and is sandwiched on a distal end side of the pedal portion such that the at least one displacement amount sensor contacts the base and the pedal portion.

7. The pedal device according to claim 6, wherein
the at least one displacement amount sensor is comprised of a plurality of displacement amount sensor.

8. A pedal device, comprising:
a pedal portion which an operator depresses;
a pedal effort detecting portion being configured to detect magnitude of the pedal effort in a depression direction when the operator depresses the pedal portion and being configured to output a signal corresponding to the magnitude of the pedal effort to outside; and
a base configured to support the pedal portion, wherein
the pedal effort detecting portion includes at least one displacement amount sensor provided so as to detect a displacement amount of the pedal portion, and being configured to output the signal, the signal corresponding to the magnitude of the detected displacement amount, and a calculating unit configured to calculate the magnitude of the pedal effort based on the signal output from the at least one displacement amount sensor,
the at least one displacement amount sensor is a conductive member having elasticity, and is formed so as to be deformable when the operator depresses the pedal portion,
the displacement amount sensor is compressed and deformed, and the displacement amount sensor outputs an electric signal corresponding to its own electric resistance changed by compression, and
the displacement amount sensor is located between the base and the pedal portion, and is sandwiched on a distal end side of the pedal portion such that the displacement amount sensor contacts the base and the pedal portion.

9. The pedal device according to claim 8, wherein
the at least one displacement amount sensor outputs the signal, the signal corresponding to its own electric resistance when the operator depresses the pedal portion.

10. The pedal device according to claim 8, wherein
the at least one displacement amount sensor is comprised of a plurality of displacement amount sensors.

11. The pedal device according to claim 10, wherein
the calculating unit sets an average value or a maximum value of the magnitude of the displacement amount of the pedal portion indicated by each of the plurality of signals as sent by the plurality of displacement amount sensors amount sensors as the magnitude of the pedal effort.

12. The pedal device according to claim 8, further comprising a base configured to support the pedal portion, wherein the base is configured to be capable of adjusting an attachment angle of the pedal portion.

13. The pedal device according to claim 8, wherein the conductive member has an electrical resistance which is changeable based on compression of the conductive member; and the displacement amount sensor is configured to output the signal, the signal corresponding to the changeable electrical resistance upon the compression of the conductive member when the operator depresses the pedal portion.

14. A pedal device, comprising:

a pedal portion which an operator depresses; and a pedal effort detecting portion being configured to detect magnitude of the pedal effort in a depression direction when the operator depresses the pedal portion and being configured to output a signal corresponding to the magnitude of the pedal effort to outside, wherein the pedal effort detecting portion includes at least one displacement amount sensor provided so as to detect a displacement amount of the pedal portion, and being configured to output the signal, the signal corresponding to the magnitude of the detected displacement amount, a calculating unit configured to calculate the magnitude of the pedal effort based on the signal output from the at least one displacement amount sensor, and a deformable portion entirely provided between the pedal portion and the at least one displacement amount sensor and configured to be deformable when the pedal portion is depressed by the operator, the deformable portion is formed of a deformable material or a spring which is expanded and contracted by depressing on the pedal portion by the operator, the at least one displacement amount sensor is provided so as to detect a displacement amount of the deformable portion, and outputs the signal, the signal corresponding to the magnitude of the detected displacement amount, and the displacement amount sensor is directly connected to the deformable portion and detects the displacement amount of the deformable portion.

15. The pedal device according to claim 14, wherein the deformable portion is a spring which is expanded and contracted by depressing on the pedal portion by the operator.

16. The pedal device according to claim 15, wherein the pedal portion has a pedal portion side spring guide being configured to guide expansion and contraction of the spring.

17. The pedal device according to claim 16, further comprising a base configured to support the pedal portion and having a base side spring guide which is insertable into the pedal portion side spring guide and guides expansion and contraction of the spring.

18. The pedal device according to claim 14, wherein the at least one displacement amount sensor is comprised of a plurality of displacement amount sensors.

19. The pedal device according to claim 18, wherein the calculating unit sets an average value or a maximum value of the magnitude of the displacement amount of the pedal portion indicated by each of the plurality of signals as sent by the plurality of displacement amount sensors as the magnitude of the pedal effort.

* * * * *